US012669401B2

(12) United States Patent
Jeong

(10) Patent No.: US 12,669,401 B2
(45) Date of Patent: Jun. 30, 2026

(54) RAIL MANAGEMENT DEVICE

(71) Applicant: KOREA RAILROAD RESEARCH INSTITUTE (KRRI), Uiwang-si (KR)

(72) Inventor: Woo Tae Jeong, Hwaseong-si (KR)

(73) Assignee: KOREA RAILROAD RESEARCH INSTITUTE (KRRI), Uiwang-si (KR)

( * ) Notice: Subject to any disclaimer, the term of this patent is extended or adjusted under 35 U.S.C. 154(b) by 316 days.

(21) Appl. No.: 18/291,390

(22) PCT Filed: Nov. 2, 2021

(86) PCT No.: PCT/KR2021/015686
§ 371 (c)(1),
(2) Date: Jan. 23, 2024

(87) PCT Pub. No.: WO2023/042957
PCT Pub. Date: Mar. 23, 2023

(65) Prior Publication Data
US 2024/0369442 A1     Nov. 7, 2024

(30) Foreign Application Priority Data
Sep. 14, 2021     (KR) ........................ 10-2021-0122786

(51) Int. Cl.
*G01M 5/00*     (2006.01)
*B61K 9/02*     (2006.01)

(52) U.S. Cl.
CPC ............. *G01M 5/0025* (2013.01); *B61K 9/02* (2013.01); *G01M 5/0033* (2013.01)

(58) Field of Classification Search
CPC ...... G01M 5/0025; G01M 5/0033; B61K 9/02
See application file for complete search history.

(56) References Cited

U.S. PATENT DOCUMENTS 4,069,590 A  *  1/1978  Effinger ................... G01B 7/28
                                                    33/523
4,417,466 A  *  11/1983  Panetti ................... G01B 7/287
                                                    73/146
4,625,412 A  *  12/1986  Bradshaw ............ G01B 11/026
                                                    33/651.1
(Continued)

FOREIGN PATENT DOCUMENTS

JP        2001-049604 A      2/2001
JP        2003-207319 A      7/2003
(Continued)

*Primary Examiner* — John Fitzgerald
(74) *Attorney, Agent, or Firm* — Bridgeway IP Law Group, PLLC; Jihun Kim

(57)     ABSTRACT
A rail management device includes a measurement unit configured to measure upper and lateral profiles of the head portion, and a securing unit fixed to the rail and configured to support and fix the measurement unit, in which the securing unit includes a body connected to the measurement unit, an elastic clamp provided at a lower side of the body and provided to be in close contact with an upper surface of the head portion, an invariable clamp provided at one side of the body and provided to be in close contact with one side lower surface of the head portion, and a variable clamp provided at the other side of the body and provided to be in close contact with the other side lower surface of the head portion.

8 Claims, 15 Drawing Sheets

(56)               References Cited

U.S. PATENT DOCUMENTS

| | | | | |
|---|---|---|---|---|
| 5,009,014 | A | * | 4/1991 | Leach ...................... G01B 5/20 |
| | | | | 73/146 |
| 5,351,411 | A | * | 10/1994 | Gronskov ................ G01B 5/20 |
| | | | | 73/146 |
| 7,484,413 | B2 | * | 2/2009 | Georgeson ........... G01N 29/265 |
| | | | | 73/866.5 |
| 8,365,604 | B2 | * | 2/2013 | Kahn ................... G01N 29/265 |
| | | | | 73/636 |
| 2009/0107244 | A1 | * | 4/2009 | Fetzer ................... G01N 29/28 |
| | | | | 73/635 |

FOREIGN PATENT DOCUMENTS

| | | | |
|---|---|---|---|
| JP | 2015-014484 | A | 1/2015 |
| JP | 2016-211876 | A | 12/2016 |
| KR | 10-1742981 | B1 | 6/2017 |

* cited by examiner

RAIL MANAGEMENT DEVICE

TECHNICAL FIELD

The present invention relates to a rail management device that measures a profile of a rail and grinds the rail.

BACKGROUND ART

In general, a rail, which is configured to safely support a vehicle and maximally reduce traveling resistance of a vehicle wheel, is made of high-carbon steel in consideration of wear resistance and corrosion resistance as well as strength. In particular, because a rail in a curved section is subjected to strong friction with the vehicle wheel, the rail is additionally subjected to various types of heat treatments, such as quenching, in order to minimize abrasion caused by friction.

However, friction between rails and vehicle wheels is unavoidable during operations of railroad vehicles. Further, abrasion or break of the rail cannot be prevented as long as a load or impact is continuously and repeatedly transmitted to the rail through the vehicle wheel.

In particular, in case that an upper surface of a head portion of the rail, which is brought into contact with the vehicle wheel, is broken or abraded, the vehicle wheel rattles, and vibration generated in this case is transmitted to a passenger compartment, which may remarkably degrade ride quality or cause an erroneous operation of a control system or a signal system of the vehicle in some instances. This may cause a disastrous situation for subways and high-speed trains carrying large numbers of passengers.

Therefore, it is very important to often or periodically inspect the rail and repair damaged portions (the upper surface and two opposite surfaces of the head portion).

In addition, in case that the rails are connected in a longitudinal direction by welding, welded portions are formed. Because surfaces of the welded portions of the rails are uneven or irregular, the surfaces of the rails need to be uniformized by grinding. Even in the case of connected portions, scratched portions, abraded portions, surface-damaged portions, or other irregular portions of the rails in addition to the welded portions, the uneven surfaces of the rails need to be ground for performing maintenance to ensure smooth performance of the rails.

However, in order to grind the surface of the rail as described above, it is very important to grind the rail so that the rail has a surface shape of a transverse section that is identical to an original surface shape. The upper surface of the head portion of the cross-section, i.e., the transverse section of the rail defines a curved line in a transverse direction when the rail is cut and viewed in a longitudinal direction (a direction in which the rail is elongated). For convenience, in the present specification, a configuration in which the upper surface of the head portion of the rail has a cross-sectional shape curved in the transverse direction as described above is referred to as a "transverse section profile of the rail".

Meanwhile, a rail profile measurement device in the related art does not have a criterion or fixing point for determining an accurate position and height of a measurement sensor. For this reason, there is a problem in that it is difficult to recognize the accurate absolute amount of vertical abrasion, lateral abrasion, and the like even though an approximately shape is synthesized from a rail transverse section profile on the basis of measured data.

In addition, a rail grinding device in the related art is fixed to the rail or simply moves along the rail and grinds the rail while adjusting a position or angle of a grinding stone to a preset value with respect to an original transverse section of the rail. There is a problem in that the rail grinding device cannot efficiently cope with welded portions, connected portions, scratched portions, abraded portions, damaged portions, or other irregular portions of the rail.

As described above, it is necessary not only to inspect the rail often or periodically to ensure safe operations of the railroad vehicle, but also to grind the rail to uniformize the surface of the rail. Accordingly, the development is consistently conducted on devices capable of more accurately and precisely measuring the transverse section profile of the rail and grinding the surface of the rail.

DISCLOSURE

Technical Problem

The present invention has been made in an effort to solve the above-mentioned problem in the related art, and an object of the present invention is to provide a management device configured to constantly maintain a criterion or fixing point for determining an accurate position and height of a displacement sensor configured to measure a transverse section profile of a rail, thereby obtaining an accurate and precise measurement value of the transverse section profile of the rail.

Another object of the present invention is to provide a rail management device configured to be movable along a rail and automatically adjust a grinding position and grinding intensity of a grinding stone while comparing a measurement value, which is obtained by measuring a transverse section profile of the rail by using a displacement sensor, with a reference value preset to a controller, thereby accurately and precisely grinding a welded portion, a connected portion, a scratched portion, an abraded portion, a damaged portion, or other irregular portions of the rail.

Technical Solution

One aspect of the present invention provides a rail management device, which serves as a device for measuring a transverse section profile of a rail including a base portion, a web portion, and a head portion, the rail management device including: a measurement unit configured to measure upper and lateral profiles of the head portion; and a securing unit fixed to the rail and configured to support and fix the measurement unit, in which the securing unit includes: a body connected to the measurement unit; an elastic clamp provided at a lower side of the body and provided to be in close contact with an upper surface of the head portion; an invariable clamp provided at one side of the body and provided to be in close contact with one side lower surface of the head portion; and a variable clamp provided at the other side of the body and provided to be in close contact with the other side lower surface of the head portion.

Specifically, the elastic clamp may be provided as a single elastic clamp provided on a middle portion of the body or provided as at least two elastic clamps provided in a longitudinal direction of the rail, and the elastic clamp may include: a sliding pin provided to penetrate the body; and a spring fastened to the sliding pin.

Specifically, the spring may have a compressive displacement of 7 to 15 mm and move the body upward within a pressure range of 193 to 199 N in a state in which the invariable clamp and the variable clamp are in close contact with one side and the other side of the head portion.

Specifically, the invariable clamp may include: a pair of first fixing frames extending from front and rear sides of one side surface of the body, extending at least outward from one side surface of the head portion, and then extending at least immediately downward from one side lower surface of the head portion; and a first grip frame connected to lower ends of the pair of first fixing frames and having a shape capable of holding one side lower surface of the head portion.

Specifically, the variable clamp may include: a pair of second fixing frames extending from front and rear sides of the other side surface of the body, extending at least outward from the other side surface of the head portion, and then extending immediately downward by a predetermined length; a pair of rotary shafts respectively installed on inner surfaces of the pair of second fixing frames; a pair of rotary frames respectively and rotatably connected to the pair of rotary shafts and extending at least immediately downward from the other side lower surface of the head portion; an adjustment frame connected to upper ends of the pair of rotary frames; a second grip frame connected to lower ends of the pair of rotary frames and having a shape configured to provide holding the other side lower surface of the head portion; and a lever configured to penetrate the adjustment frame and installed to be connected to the other side surface of the body, the lever being configured to rotate the pair of rotary frames so that the second grip frame is brought into close contact with the other side lower surface of the head portion or spaced apart from the other side lower surface of the head portion.

Specifically, the measurement unit may include: a first main frame positioned on an upper portion of the head portion and provided to be consistent with a centerline of the head portion; a second main frame provided on the same line as the first main frame and spaced apart from the first main frame at a predetermined distance; a pair of first auxiliary frames respectively connected to two opposite sides of the first main frame, extending downward at predetermined gradients, extending at least to a position of a lower surface of the head portion, and connected to the body; a pair of second auxiliary frames provided on the same line as the pair of first auxiliary frames and spaced apart from the pair of first auxiliary frames at predetermined distances; and a pair of displacement sensors respectively and movably mounted on the pair of second auxiliary frames.

Specifically, the measurement unit may further include: a driving pulley installed between the first main frame and the second main frame and configured to be rotated by driving power of a motor; a pair of driven pulleys installed between ends of the pair of first auxiliary frames and ends of the pair of second auxiliary frames, connected to the driving pulley by a driving belt, and configured to rotate by receiving the driving power; and an idle pulley installed between the first main frame and the second main frame, installed adjacent to a lower side of the driving pulley, and configured to guide an inner belt of the driving belt.

Specifically, the pair of displacement sensors may be mounted on the driving belt configured to rotate in the same direction, the pair of displacement sensors may measure, in real time, an abrasion amount of vertical abrasion and lateral abrasion of the head portion and transmit the abrasion amount to a controller in a wired or wireless manner so that an absolute abrasion amount and a change amount related to a final profile of the head portion is recognized, any one displacement sensor may be provided between any one driven pulley and the driving pulley and mounted on an outer belt of the driving belt, and the other displacement sensor may be provided between the other driven pulley and the driving pulley and mounted on the inner belt of the driving belt so that heights and movement amounts are maintained to be equal to one another or synchronized when the upper and lateral profiles of the head portion are measured.

Advantageous Effects

The rail management device according to the present invention may be configured to constantly maintain the criteria or fixing points for determining the accurate positions and heights of the displacement sensors configured to measure the transverse section profile of the rail, thereby obtaining the accurate and precise measurement value of the transverse section profile of the rail.

In addition, the rail management device according to the present invention may constantly maintain or synchronize the heights and movement amounts of the two displacement sensors, which are positioned at the two opposite sides of the transverse section profile of the rail, by using the pulleys with the triangular structure and the two belt structures connected to the pulleys and using the single motor. Further, the rail management device may be configured to perform the measurement based on the upper surface of the base portion of the rail that is hardly deformed even though the rail is used over a long period of time on site. Therefore, it is possible to accurately and precisely measure the absolute abrasion amount and the change amount on the upper and lateral surfaces of the head portion of the rail.

In addition, the rail management device according to the present invention may constantly maintain or synchronize the heights and movement amounts of the two displacement sensors, which are positioned at the two opposite sides of the transverse section profile of the rail, by using the single belt structure and using the single motor. Further, the rail management device may be configured to perform the measurement based on the lower surface of the head portion of the rail that is hardly deformed even though the rail is used over a long period of time on site. Therefore, it is possible to accurately and precisely measure the absolute abrasion amount and the change amount on the upper and lateral surfaces of the head portion of the rail.

In addition, the rail management device according to the present invention may move along the rail and be configured to compare the measurement value, which is obtained by measuring the transverse section profile of the rail by using the displacement sensors, with the reference value preset to the controller and automatically adjust the grinding position and the grinding intensity of the grinding stone, thereby accurately and precisely grinding the welded portion, the connected portion, the scratched portion, the abraded portion, the damaged portion, or other irregular portions of the rail.

In addition, the rail management device according to the present invention may be configured to compare the measurement value, which is obtained by measuring the transverse section profile of the rail by using the displacement sensors, with the reference value preset to the controller and automatically control the rotational force of the grinding stone, the upward and downward movements of the grinding stone, the leftward and rightward movements of the grinding stone, the grinding angle of the grinding stone, and the forward and rearward movements of the grinding stone. Therefore, it is possible to significantly improve the grinding quality of the rail, continuously perform the grinding operation in the longitudinal direction of the rail, and identify the ground state and the profile shape in real time.

MODE FOR INVENTION

Figure 1:
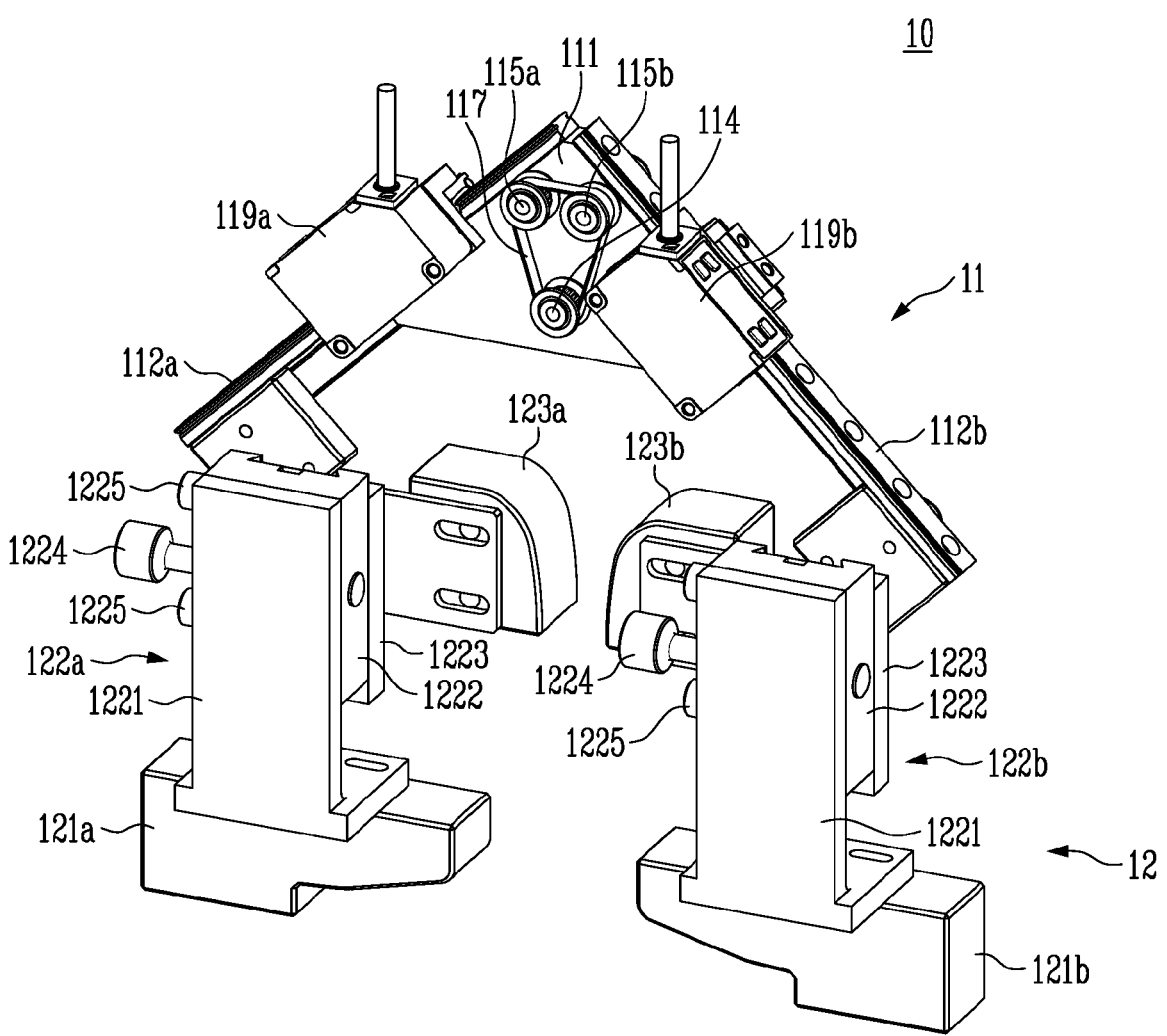
FIG. 1 is a perspective view of a rail management device according to a first embodiment of the present invention.

Other objects, particular advantages, and novel features of the present invention will be more clearly understood from the following detailed description and the exemplary embodiments with reference to the accompanying drawings. In giving reference numerals to constituent elements of the respective drawings in the present specification, it should be noted that the same constituent elements will be designated by the same reference numerals, if possible, even though the constituent elements are illustrated in different drawings. In addition, in the description of the present invention, the specific descriptions of publicly known related technologies will be omitted when it is determined that the specific descriptions may unnecessarily obscure the subject matter of the present invention.

Hereinafter, exemplary embodiments of the present invention will be described in detail with reference to the accompanying drawings.

Figure 2:
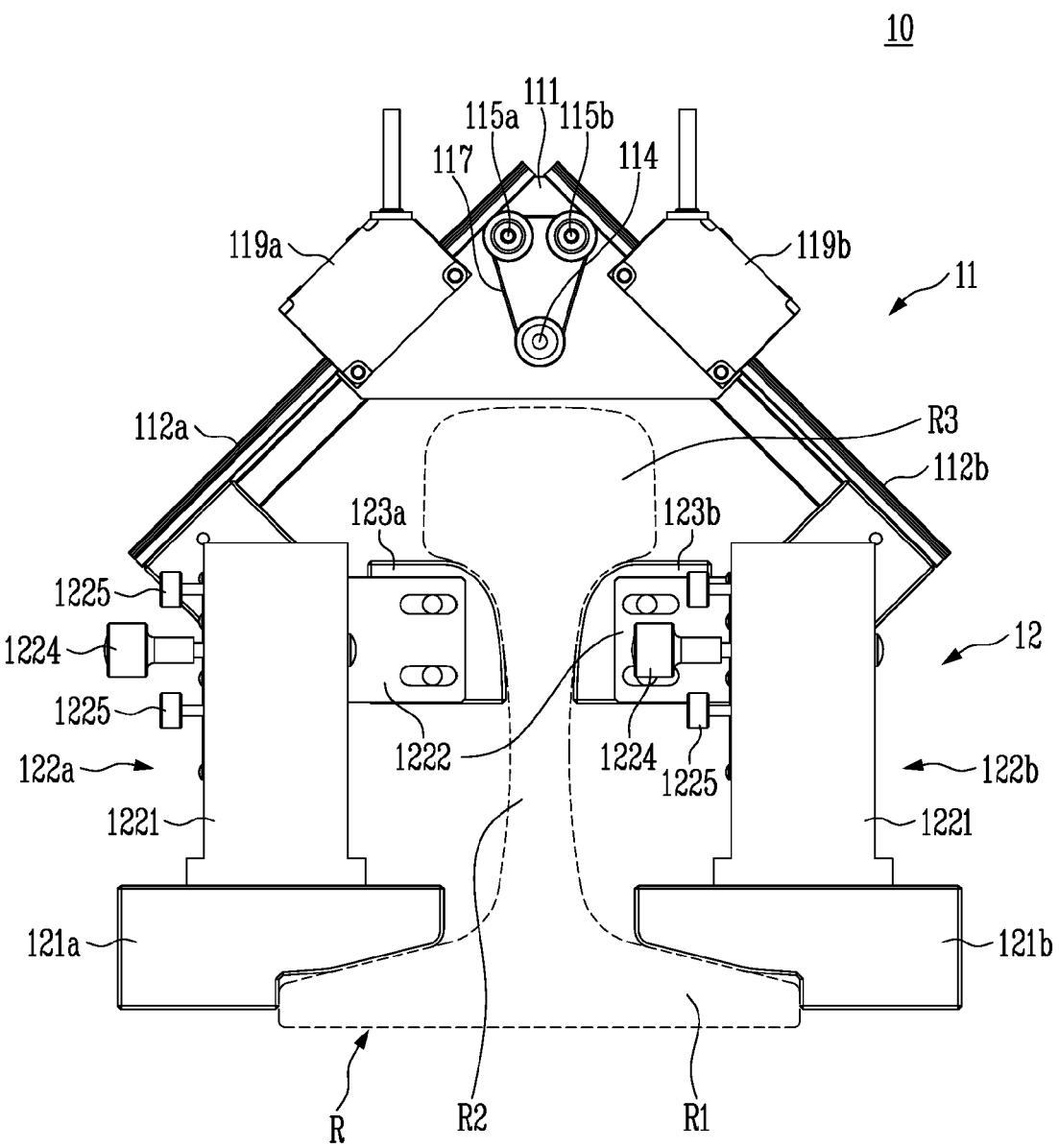
FIG. 2 is a front view of the rail management device according to the first embodiment of the present invention.
Figure 3:
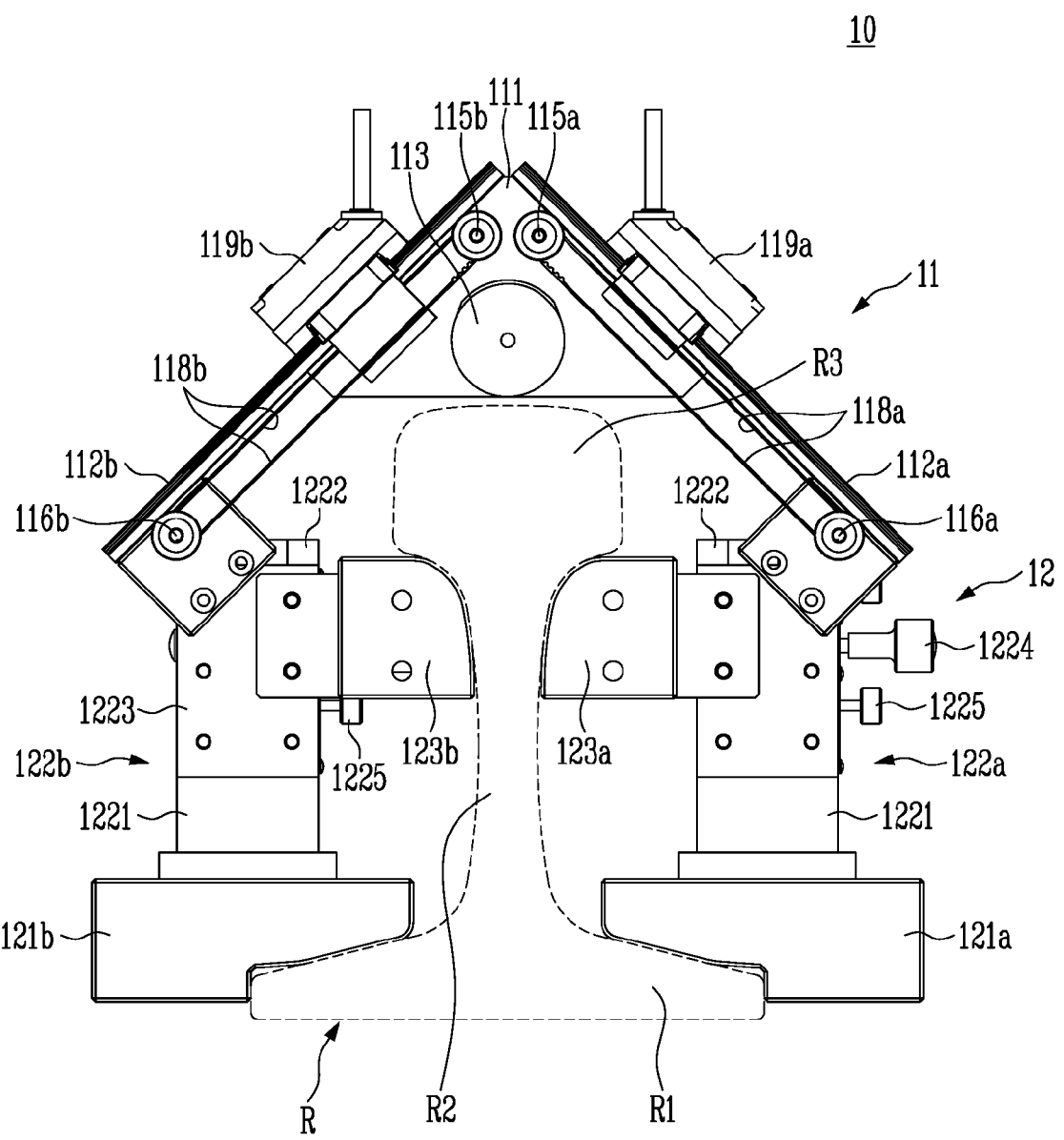
FIG. 3 is a rear view of the rail management device according to the first embodiment of the present invention.
Figure 4:
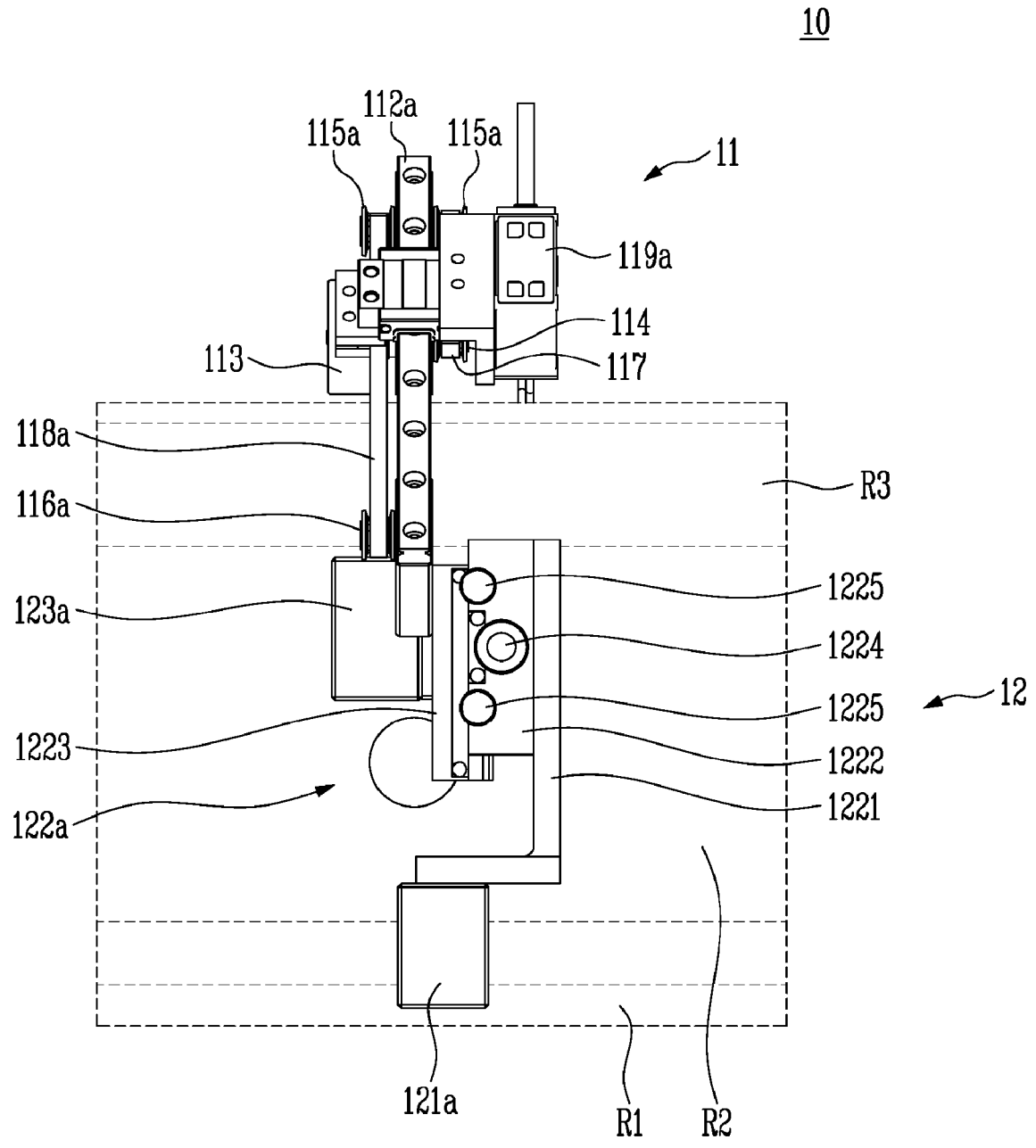
FIG. 4 is a side view of the rail management device according to the first embodiment of the present invention.

FIG. 1 is a perspective view of a rail management device according to a first embodiment of the present invention, FIG. 2 is a front view of the rail management device according to the first embodiment of the present invention, FIG. 3 is a rear view of the rail management device according to the first embodiment of the present invention, and FIG. 4 is a side view of the rail management device according to the first embodiment of the present invention.

As illustrated in FIGS. 1 to 4, a rail management device 10 according to a first embodiment of the present invention may serve as a rail profile measurement device for measuring a transverse section profile of a rail R including a base portion R1, a web portion R2, and a head portion R3 and include a measurement unit 11 configured to measure upper and lateral profiles of the head portion R3, and a securing unit 12 fixed to the rail R and configured to support and fix the measurement unit 11.

The measurement unit 11 may measure the upper and lateral profiles of the head portion R3 and include a main frame 111, a pair of auxiliary frames 112a and 112b, a driving pulley 114, a pair of first driven pulleys 115a and 115b, a pair of second driven pulleys 116a and 116b, a driving belt 117, a pair of timing belts 118a and 118b, and a pair of displacement sensors 119a and 119b.

The main frame 111 may be positioned on an upper portion of the head portion R3 when the measurement unit 11 is installed on the rail R by the securing unit 12.

The main frame 111 may be provided in the form of a plate having an isosceles triangular shape, and a vertex of the main frame 111 may be consistent with a centerline of the head portion R3.

The pair of auxiliary frames 112a and 112b may be respectively connected to two opposite sides of the main frame 111 and extend downward at predetermined gradients at least to a position of a lower surface of the head portion R3.

Ends of the pair of auxiliary frames 112a and 112b may be respectively connected to second sliding members 1223 of the securing unit 12, and heights of the pair of auxiliary frames 112a and 112b may be determined by a pair of height adjusting parts 122a and 122b of the securing unit 12.

The driving pulley 114 may be installed on the main frame 111 and rotated by driving power of a motor 113.

The driving pulley 114 may be installed to define a triangular structure together with the pair of first driven pulleys 115a and 115b. The driving pulley 114 may be connected to the pair of first driven pulleys 115a and 115b by the driving belt 117 and transmit driving power to the pair of first driven pulleys 115a and 115b.

The pair of first driven pulleys 115a and 115b may be installed on the main frame 111 and define the triangular structure together with the driving pulley 114.

The pair of first driven pulleys 115a and 115b may be connected to the driving pulley 114 by the driving belt 117 and rotated by receiving the driving power of the driving pulley 114.

In addition, the pair of first driven pulleys 115a and 115b may be connected to the pair of second driven pulleys 116a and 116b by the pair of timing belts 118a and 118b and transmit the driving power, which is received from the driving pulley 114, to the pair of second driven pulleys 116a and 116b.

The pair of second driven pulleys 116a and 116b may be installed at the ends of the pair of auxiliary frames 112a and 112b.

The pair of second driven pulleys 116a and 116b may be respectively connected to the pair of first driven pulleys 115a and 115b by the pair of timing belts 118a and 118b and rotated by the driving power received from the pair of first driven pulleys 115a and 115b.

The driving belt 117 may connect the driving pulley 114 and the pair of first driven pulleys 115a and 115b and transmit the driving power of the driving pulley 114 to the pair of first driven pulleys 115a and 115b.

The pair of timing belts 118a and 118b may connect the pair of first driven pulleys 115a and 115b and the pair of second driven pulleys 116a and 116b and transmit the driving power of the pair of first driven pulleys 115a and 115b to the pair of second driven pulleys 116a and 116b while rotating in the same direction.

Specifically, any one timing belt 118a of the pair of timing belts 118a and 118b may connect any one first driven pulley 115a of the pair of first driven pulleys 115a and 115b and any one second driven pulley 116a of the pair of second driven pulleys 116a and 116b.

In addition, the other timing belt 118b of the pair of timing belts 118a and 118b may connect the other first driven pulley 115b of the pair of first driven pulleys 115a and 115b and the other second driven pulley 116b of the pair of second driven pulleys 116a and 116b.

One displacement sensor of the pair of displacement sensors 119a and 119b may be mounted on each of the pair of timing belts 118a and 118b.

The pair of displacement sensors 119a and 119b may be movably mounted on the pair of auxiliary frames 112a and 112b and measure the upper and lateral profiles of the head portion R3. The pair of displacement sensors 119a and 119b may each be a laser displacement sensor. However, the present invention is not limited thereto, and other sensors capable of measuring displacements may, of course, be included.

The pair of displacement sensors 119a and 119b may be respectively mounted on the pair of timing belts 118a and 118b that rotates in the same direction. The pair of displacement sensors 119a and 119b may measure, in real time, abrasion amounts of vertical abrasion and lateral abrasion of the head portion R3 and transmit the abrasion amount to a controller (not illustrated) in a wired or wireless manner so that an absolute abrasion amount and a change amount of a final profile of the head portion R3 may be recognized.

In addition, any one displacement sensor 119a may be mounted on an outer belt of any one timing belt 118a, and the other displacement sensor 119b may be mounted on an inner belt of the other timing belt 118b so that the heights and movement amounts of the pair of displacement sensors 119a and 119b may be maintained to be equal to one another or synchronized during the process of measuring the upper and lateral profiles of the head portion R3.

The securing unit 12 may be fixed to the rail R and support and fix the measurement unit 11.

In order to obtain an accurate and precise measurement value of a transverse section profile of the rail R by the pair of displacement sensors 119a and 119b, the securing unit 12 may be configured to constantly maintain criteria or fixing points for determining accurate positions and heights of the pair of displacement sensors 119a and 119b configured to measure the transverse section profile of the rail R, and the securing unit 12 may include a pair of lower fixing blocks 121a and 121b, the pair of height adjusting parts 122a and 122b, and a pair of upper fixing blocks 123a and 123b.

The pair of lower fixing blocks 121a and 121b may be fixed to one side upper surface and the other side upper surface of the base portion R1.

The pair of height adjusting parts 122a and 122b may be connected to the measurement unit 11 and respectively fixed to the pair of lower fixing blocks 121a and 121b.

The pair of height adjusting parts 122a and 122b may each include a support 1221 fixed to the upper surface of the base portion R1 and extending immediately upward, a first sliding member 1222 fixed to the support 1221, the second sliding member 1223 coupled to the first sliding member 1222 and configured to be slidable upward or downward, an adjustment member 1224 configured to move the second sliding member 1223 upward or downward, and a fixing member 1225 configured to fix the second sliding member 1223 moved by the adjustment member 1224.

In the above-mentioned configuration, the adjustment member 1224 may include a handle configured to penetrate the first sliding member 1222 and rotatably connected to the first sliding member 1222, and a worm gear extending from an end of the handle to the second sliding member 1223. In this case, the second sliding member 1223 may have a rack gear corresponding to the worm gear.

In the present embodiment, the configuration has been described in which the adjustment member 1224 has the worm gear, and the second sliding member 1223 has the rack gear, such that the second sliding member 1223 moves upward or downward as the handle of the adjustment member 1224 rotates leftward or rightward. However, the present invention is not limited thereto, and the adjustment member 1224 may include other structures capable of moving the second sliding member 1223 upward or downward.

In addition, the fixing member 1225 may penetrate the first sliding member 1222 and be rotatably connected to the first sliding member 1222. The fixing member 1225 may be configured as at least one or more bolts capable of pressing and fixing the second sliding member 1223 in a state in which the pair of upper fixing blocks 123a and 123b is in close contact with the lower surface of the head portion R3 or capable of releasing the second sliding member 1223 so that the measurement unit 11 may be removed from the rail R.

The pair of upper fixing blocks 123a and 123b may be respectively connected to upper portions of the pair of height adjusting parts 122a and 122b and fixed to one side lower surface and the other side lower surface of the head portion R3 by the pair of height adjusting parts 122a and 122b.

The pair of upper fixing blocks 123a and 123b may be fixedly connected to the second sliding members 1223 and come into close contact with one side lower surface and the other side lower surface of the head portion R3 as the pair of upper fixing blocks 123a and 123b is fixed by the fixing members 1225 in the state in which the second sliding members 1223 are moved upward by the adjustment members 1224.

The rail management device 10 of the present embodiment configured as described above may easily measure the shape of the surface of the rail R and the abrasion amount of the rail R while simultaneously moving the pair of displacement sensors 119a and 119b by using only the single motor 113.

In addition, in the rail management device 10 of the present embodiment, the motor 113 is connected to the belt and pulley structures, such that the pair of displacement sensors 119a and 119b may simultaneously reciprocate at the same height and position during the process of measuring the transverse section profile of the rail R.

In addition, the rail management device 10 of the present embodiment is equipped with the securing unit 12 configured to adjust the height thereof and provided between the base portion R1 of the rail R and the head portion R3 of the rail R in order to compensate for a part where the heights of the pair of displacement sensors 119a and 119b are not always constant because of abrasion of the rail R. Therefore, the pair of displacement sensors 119a and 119b may be positioned at the constant height, such that it is possible to configure the rail profile having a final reliable shape by collecting data measured by the pair of displacement sensors 119a and 119b.

In addition, the rail management device 10 of the present embodiment is configured to constantly maintain the criteria or fixing points for determining the accurate positions and heights of the pair of displacement sensors 119a and 119b configured to measure the transverse section profile of the rail R, thereby obtaining the accurate and precise measurement value of the transverse section profile of the rail R.

In addition, the rail management device 10 of the present embodiment may constantly maintain or synchronize the heights and movement amounts of the pair of displacement sensors 119a and 119b, which is positioned at the two opposite sides of the transverse section profile of the rail R, by using the pulleys with the triangular structure and the two belt structures connected to the pulleys and using the single motor 113. Further, the rail management device 10 may be configured to perform the measurement based on the upper surface of the base portion RI that is hardly deformed even though the rail R is used over a long period of time on site. Therefore, it is possible to accurately and precisely measure the absolute abrasion amount and the change amount on the upper and lateral surfaces of the head portion R3.

Figure 5:
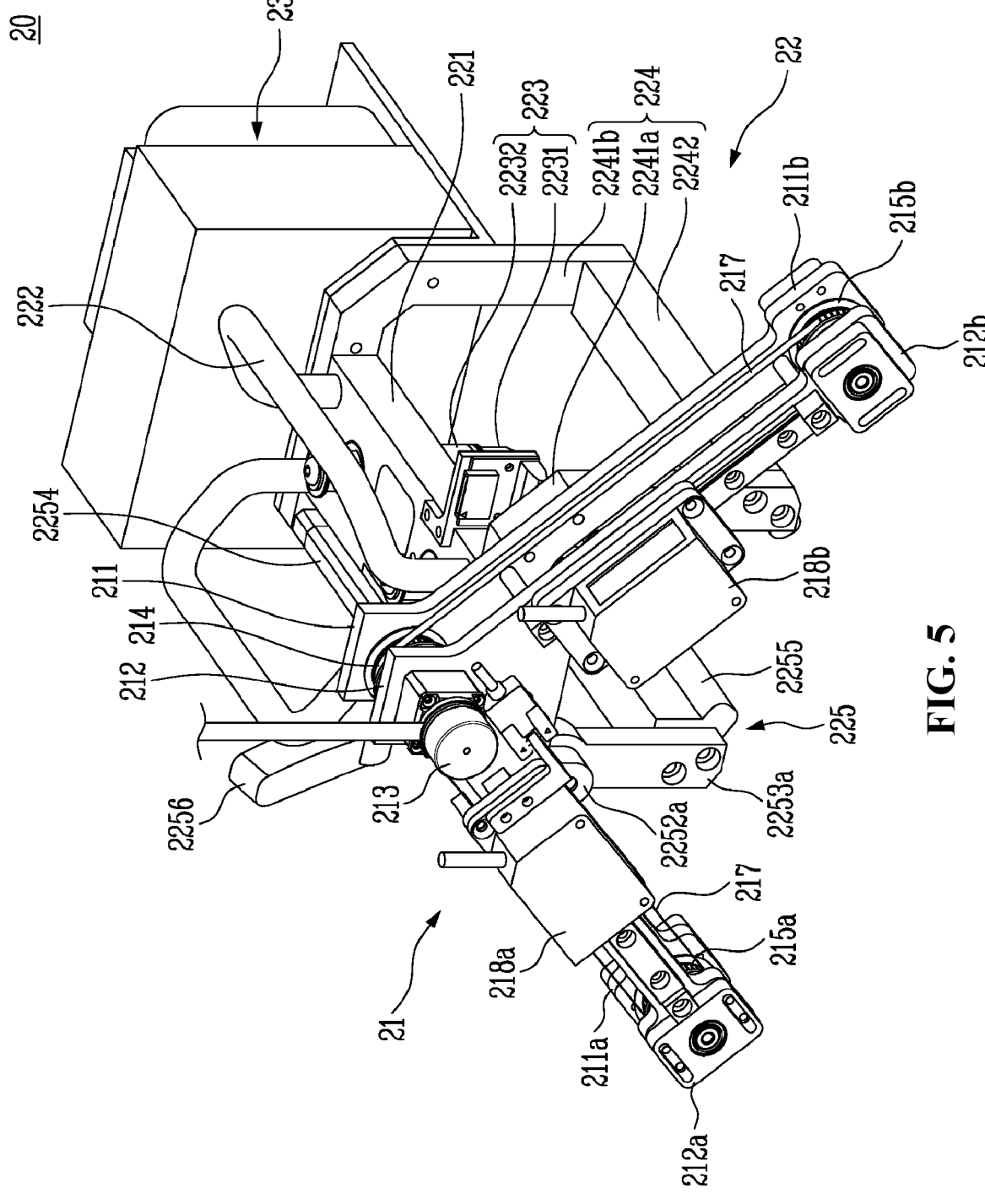
FIG. 5 is a front perspective view of a rail management device according to a second embodiment of the present invention.
Figure 6:
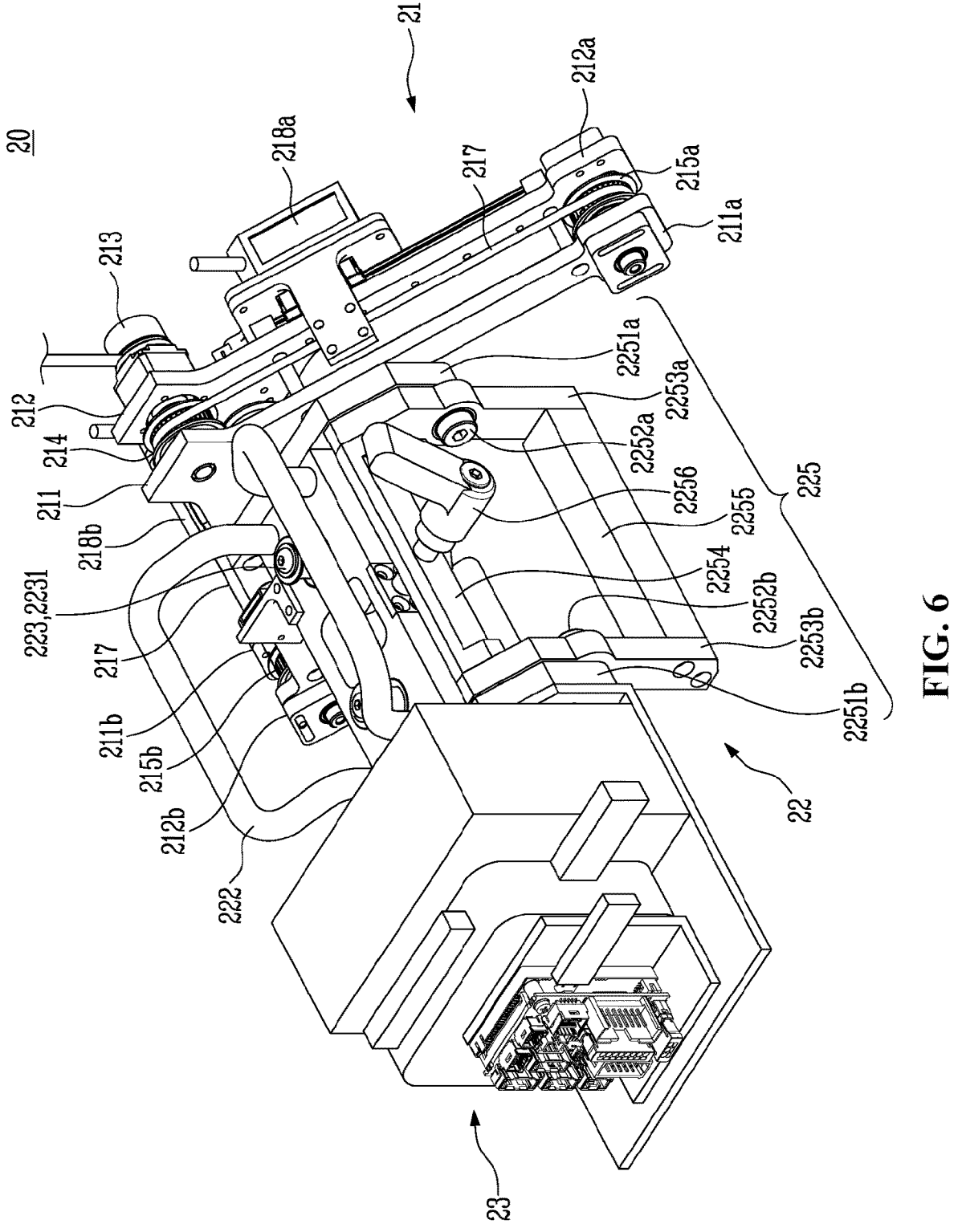
FIG. 6 is a rear perspective view of the rail management device according to the second embodiment of the present invention.
Figure 7:
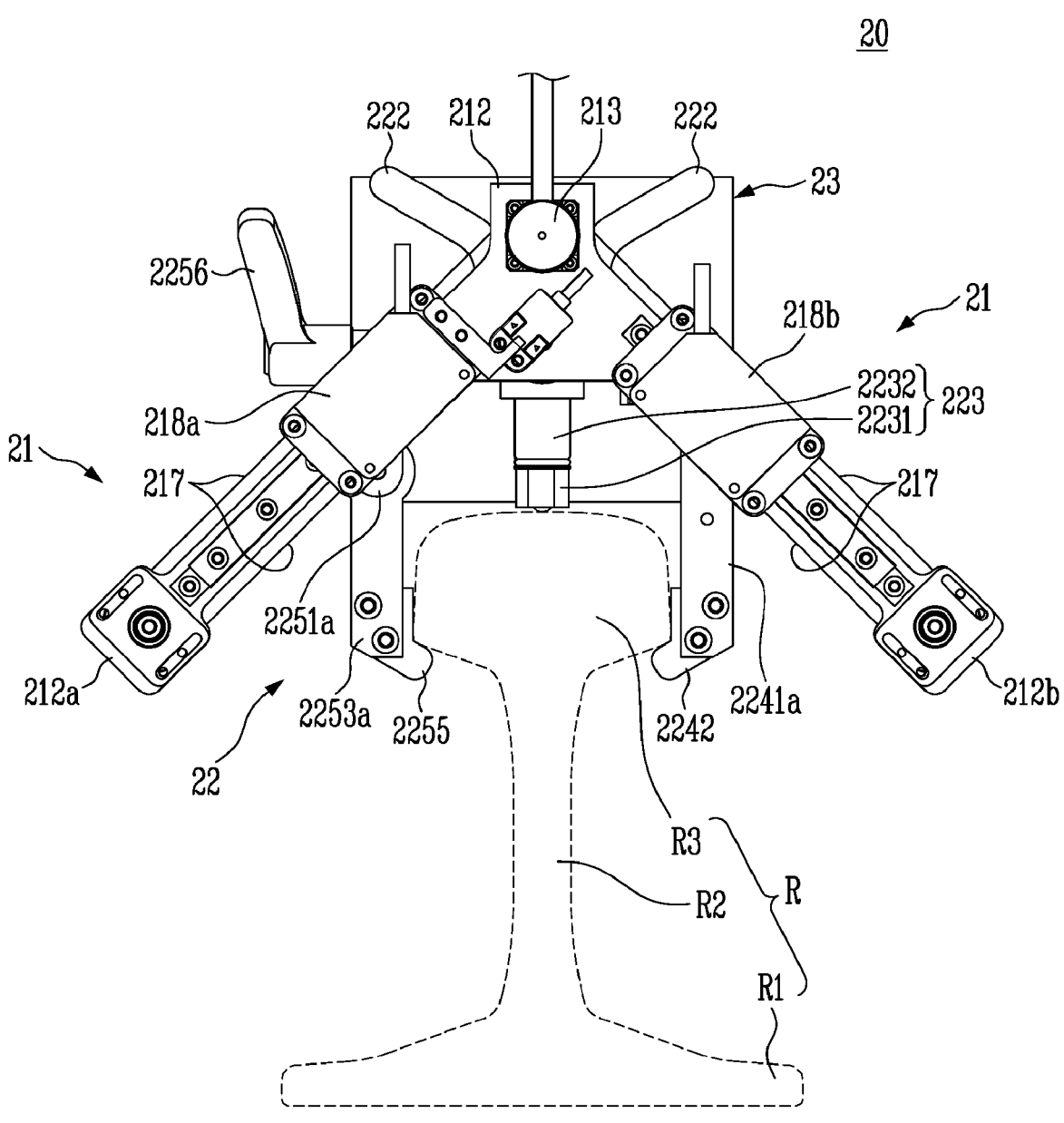
FIG. 7 is a front view of the rail management device according to the second embodiment of the present invention.
Figure 8:
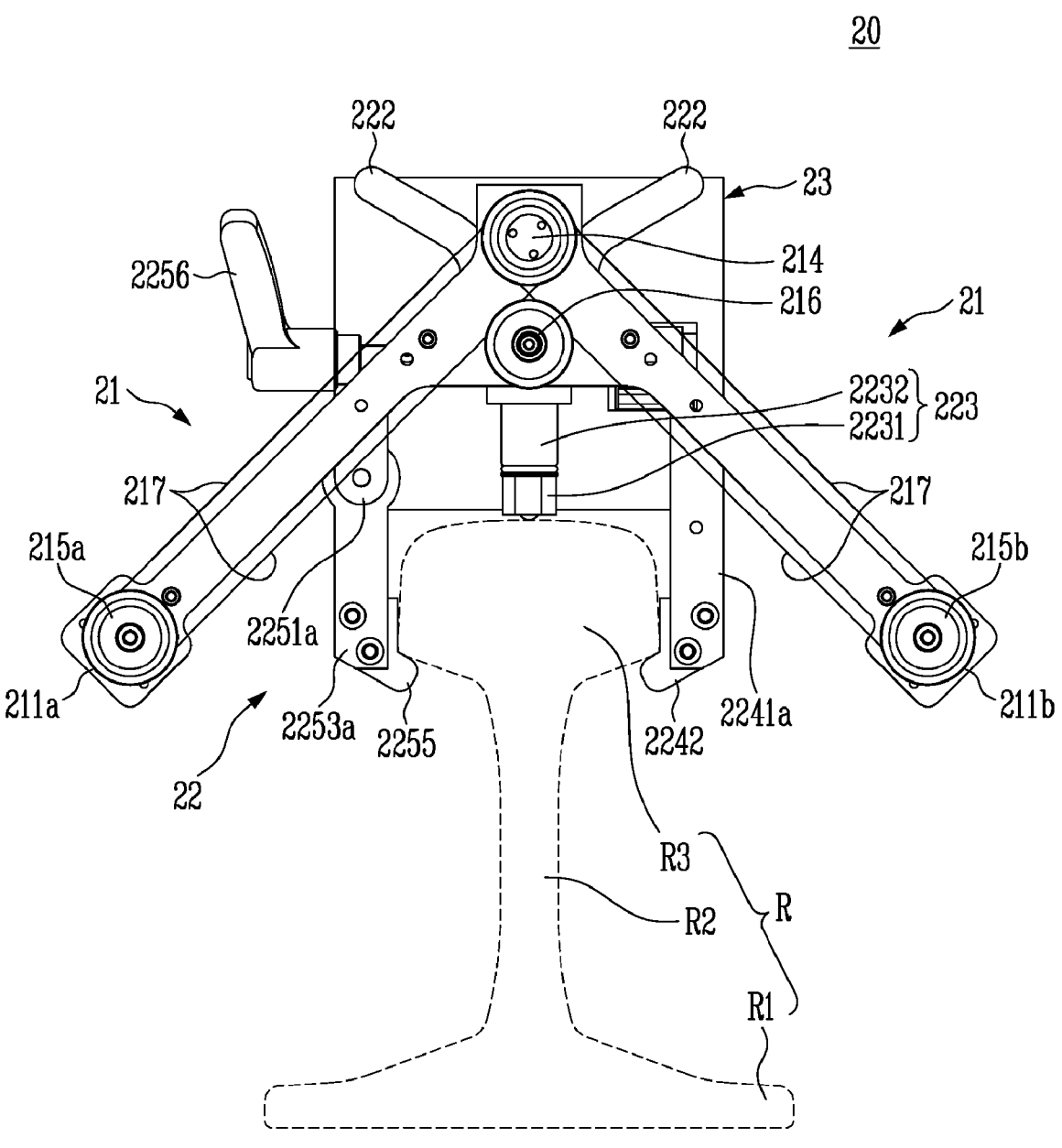
FIG. 8 is a view for explaining a pulley/belt structure of the rail management device according to the second embodiment of the present invention.
Figure 9:
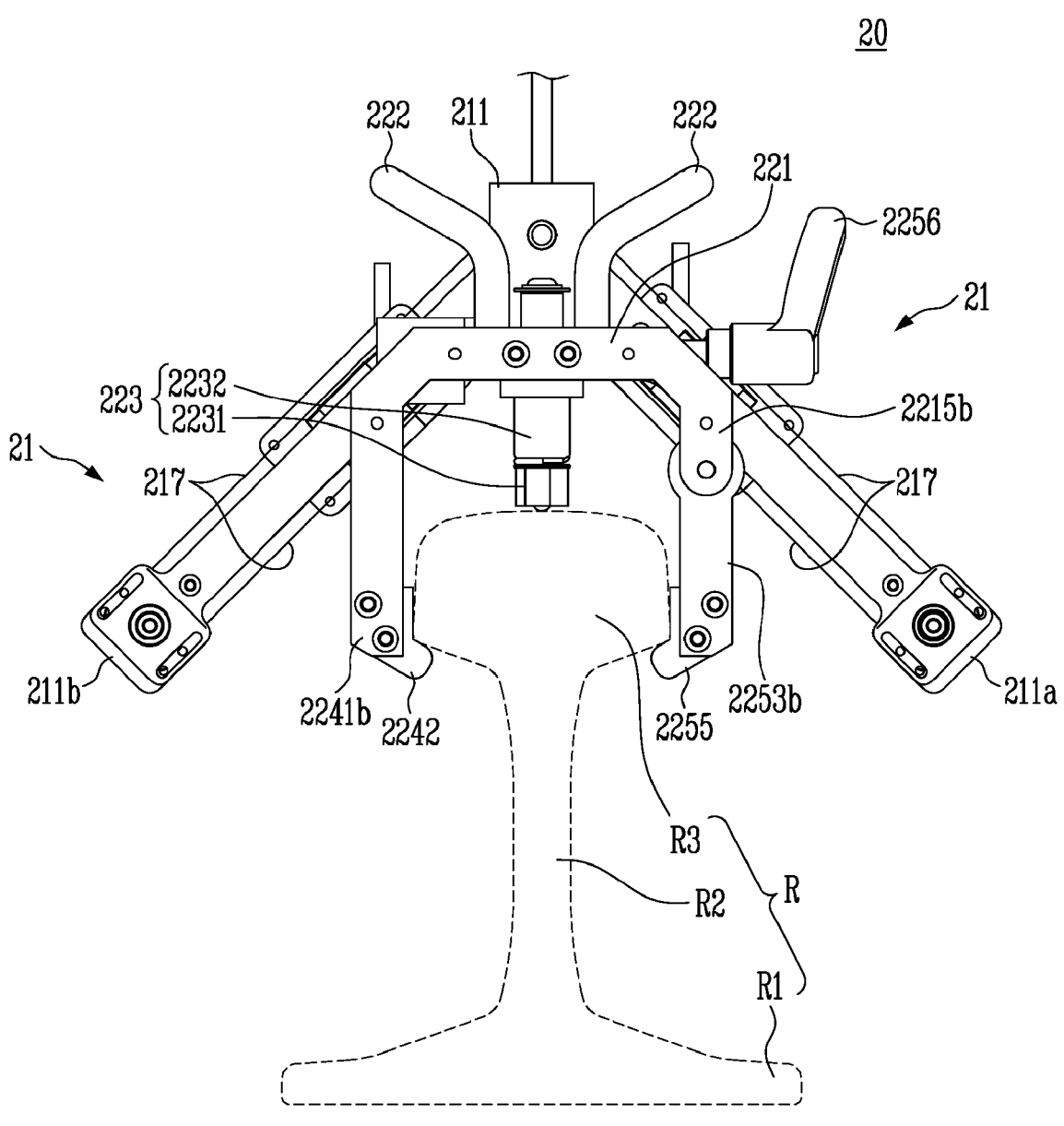
FIG. 9 is a rear view illustrating a state in which a controller is excluded from the rail management device according to the second embodiment of the present invention.
Figure 10:
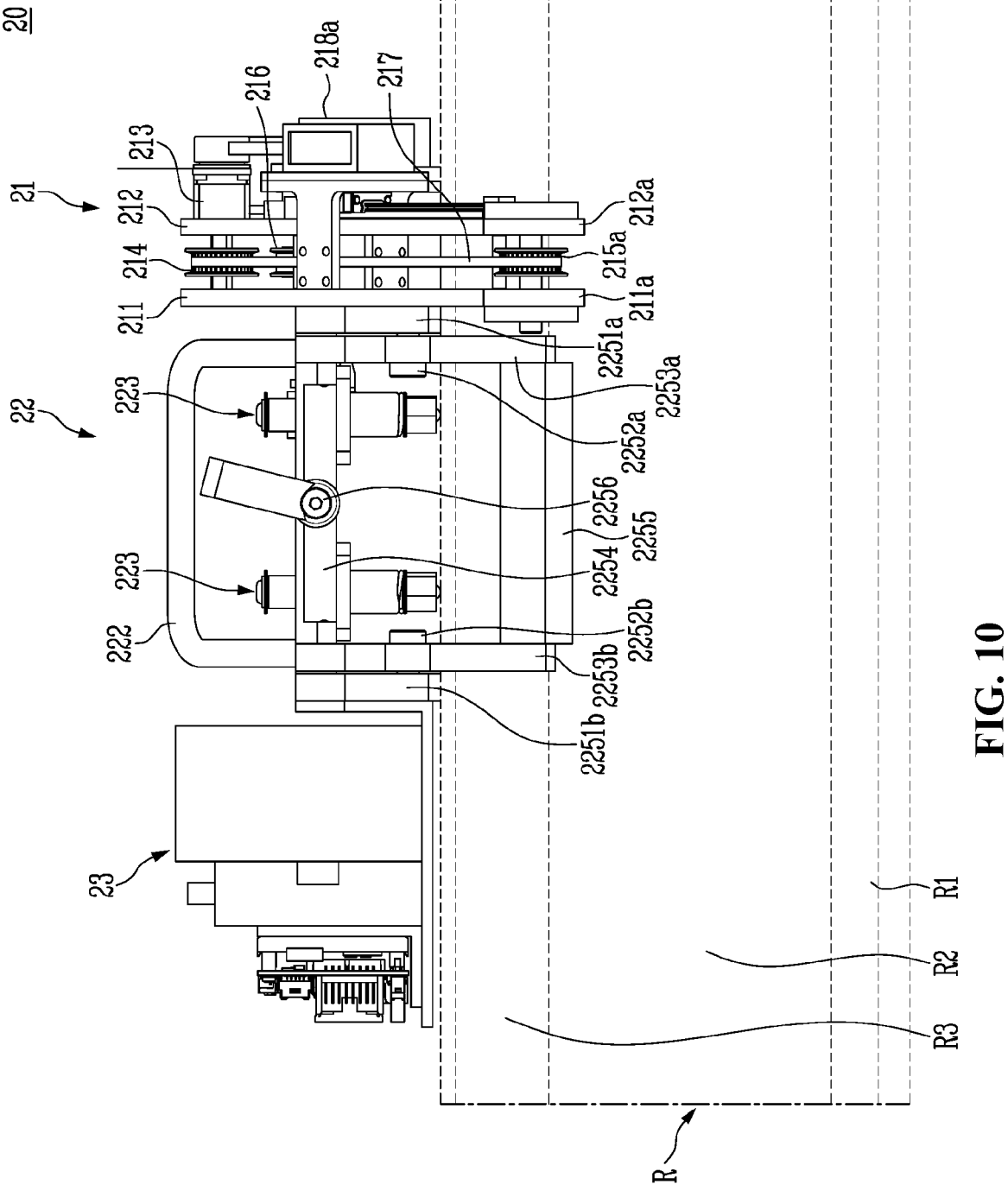
FIG. 10 is a side view of the rail management device according to the second embodiment of the present invention.

FIG. 5 is a front perspective view of a rail management device according to a second embodiment of the present invention, FIG. 6 is a rear perspective view of the rail management device according to the second embodiment of the present invention, FIG. 7 is a front view of the rail management device according to the second embodiment of the present invention, FIG. 8 is a view for explaining a pulley/belt structure of the rail management device according to the second embodiment of the present invention, FIG. 9 is a rear view illustrating a state in which a controller is excluded from the rail management device according to the second embodiment of the present invention, and FIG. 10 is a side view of the rail management device according to the second embodiment of the present invention.

As illustrated in FIGS. 5 to 10, a rail management device 20 according to a second embodiment of the present invention may serve as a rail profile measurement device for measuring a transverse section profile of the rail R including the base portion R1, the web portion R2, and the head portion R3 and include a measurement unit 21 configured to measure upper and lateral profiles of the head portion R3, and a securing unit 22 fixed to the rail R and configured to support and fix the measurement unit 21.

The measurement unit 21 may measure the upper and lateral profiles of the head portion R3 and include a first main frame 211, a pair of first auxiliary frames 211a and 211b, a second main frame 212, a pair of second auxiliary frames 212a and 212b, a driving pulley 214, a pair of driven pulleys 215a and 215b, an idle pulley 216, a driving belt 217, and a pair of displacement sensors 218a and 218b.

The first main frame 211 may be positioned on the upper portion of the head portion R3 when the measurement unit 21 is installed on the rail R by the securing unit 22.

The first main frame 211 may be provided in the form of a plate having an isosceles triangular shape, and a vertex of the first main frame 211 may be consistent with a centerline of the head portion R3.

The pair of first auxiliary frames 211a and 211b may be respectively connected to two opposite sides of the first main frame 211 and extend downward at predetermined gradients at least to the position of the lower surface of the head portion R3.

The pair of first auxiliary frames 211a and 211b may be connected to a body 221 of the securing unit 22.

When the measurement unit 21 is installed on the rail R by the securing unit 22, the second main frame 212 may be positioned on the upper portion of the head portion R3, provided on the same line as the first main frame 211, and spaced apart from the first main frame 211 at a predetermined distance.

The second main frame 212 may be provided in the form of a plate having an isosceles triangular shape identical or similar to the shape of the first main frame 211, and a vertex of the second main frame 212 may be consistent with the centerline of the head portion R3.

The pair of second auxiliary frames 212a and 212b may be respectively connected to two opposite sides of the second main frame 212 and extend downward at predetermined gradients at least to the position of the lower surface of the head portion R3, provided on the same line as the pair of first auxiliary frames 211a and 211b, and spaced apart from the pair of first auxiliary frames 211a and 211b at predetermined distances.

The driving pulley 214 may be installed between the first main frame 211 and the second main frame 212 and rotated by driving power of a motor 213.

The driving pulley 214 may be connected to the pair of driven pulleys 215a and 215b by the driving belt 217 and transmit the driving power to the pair of driven pulleys 215a and 215b.

The pair of driven pulleys 215a and 215b may be respectively installed between ends of the pair of first auxiliary frames 211a and 211b and ends of the pair of second auxiliary frames 212a and 212b.

The pair of driven pulleys 215a and 215b may be connected to the driving pulley 214 by the driving belt 217 and rotated by receiving the driving power.

In the present embodiment, the driven pulleys 215a and 215b may each be a tension pulley that may prevent the driving belt 217 from being stretched.

The idle pulley 216 may be installed between the first main frame 211 and the second main frame 212.

The idle pulley 216 may be installed adjacent to a lower side of the driving pulley 214 and guide an inner belt of the driving belt 217 so that the inner belt of the driving belt 217 may rotate between the pair of driven pulleys 215a and 215b.

The driving belt 217 may connect the driving pulley 214 and the pair of driven pulleys 215a and 215b and transmit the driving power of the driving pulley 214 to the pair of driven pulleys 215a and 215b while rotating in the same direction.

One displacement sensor of the pair of displacement sensors 218a and 218b may be respectively mounted at left and right sides of the driving belt 217.

The pair of displacement sensors 218a and 218b may be movably mounted on the pair of second auxiliary frames 212a and 212b and measure the upper and lateral profiles of the head portion R3. The pair of displacement sensors 218a and 218b may each be a laser displacement sensor. However, the present invention is not limited thereto, and other sensors capable of measuring displacements may, of course, be included.

The pair of displacement sensors 218a and 218b may be respectively mounted at the left and right sides of the driving belt 217 that rotates in the same direction. The pair of displacement sensors 218a and 219b may measure, in real time, abrasion amounts of vertical abrasion and lateral abrasion of the head portion R3 and transmit the abrasion amount to a controller 23 in a wired or wireless manner so that an absolute abrasion amount and a change amount of a final profile of the head portion R3 may be recognized.

In addition, any one displacement sensor 218a may be provided between any one driven pulley 215a and the driving pulley 214 and mounted on an outer belt of the driving belt 217, and the other displacement sensor 218b may be provided between the other driven pulley 215b and the driving pulley 214 and mounted on an inner belt of the driving belt 217 so that the heights and movement amounts of the pair of displacement sensors 218a and 218b may be maintained to be equal to one another or synchronized during the process of measuring the upper and lateral profiles of the head portion R3.

The securing unit 22 may be fixed to the rail R and support and fix the measurement unit 21.

In order to obtain an accurate and precise measurement value of the transverse section profile of the rail R by the pair of displacement sensors 218a and 218b, the securing unit 22 may be configured to constantly maintain criteria or fixing points for determining accurate positions and heights of the pair of displacement sensors 218a and 218b configured to measure the transverse section profile of the rail R, and the securing unit 22 may include the body 221, handles 222, an elastic clamp 223, an invariable clamp 224, a variable clamp 225, and the controller 23.

The body 221 may be connected to the pair of first auxiliary frames 211a and 211b of the measurement unit 21.

The handles 222 may be provided on an upper portion of the body 221 to install the rail management device 20 on the rail R or remove the rail management device 20 from the rail R.

In addition, the controller 23 may be provided rearward of the body 221. The controller 23 may receive, in a wired or wireless manner, the data related to the abrasion amount of the vertical abrasion and the lateral abrasion of the head portion R3 measured, in real time, by the pair of displacement sensors 218a and 218b and recognize and manage the absolute abrasion amount and the change amount of the final profile of the head portion R3.

In the present embodiment, the rail management device 20 is supported on and fixed to the rail R by the clamp part. In this case, the clamp part may include the elastic clamp 223, the invariable clamp 224, and the variable clamp 225.

The elastic clamp 223 may be disposed at a lower side of the body 221. When the rail management device 20 is installed on the rail R, the invariable clamp 224 and the variable clamp 225 may be fixed to the rail R and be in close contact with the upper surface of the head portion R3. In this state, the invariable clamp 224 and the variable clamp 225 may serve to move the body 221 upward by applying pressure applied by elasticity, thereby fixing an upper surface of the body 221.

The elastic clamp 223 may be provided as a single elastic clamp provided on a middle portion of the body 221 or provided as at least two elastic clamps provided in a longitudinal direction of the rail R. The elastic clamp 223 may include a sliding pin 2231 and a spring 2232.

The sliding pin 2231 may penetrate the body 221 and be configured to slide upward or downward by an external force.

The spring 2232 may be fastened to the sliding pin 2231 extended downward from the lower portion of the body 221, and the spring 2232 may apply an elastic force when pressure is applied to the end of the sliding pin 2231.

The spring 2232 may be an annular coil spring having a compressive displacement of 7 to 15 mm and configured to move the body 221 upward within a pressure range of 193 to 199 N in a state in which the invariable clamp 224 and the variable clamp 225 are in close contact with one side and the other side of the head portion R3. However, the present invention is not limited thereto, and an elastic member configured to apply an elastic force by an external force may, of course, be included.

The invariable clamp 224 may be provided at one side of the body 221. When the rail management device 20 is installed on the rail R, the invariable clamp 224 may serve to fix one side of the body 221 by pressure applied by elasticity of the elastic clamp 223 in the state in which the elastic clamp 223 and the variable clamp 225 are fixed to the rail R and are in close contact with one side lower surface of the head portion R3.

The invariable clamp 224 may include a pair of first fixing frames 2241a and 2241b and a first grip frame 2242.

The pair of first fixing frames 2241a and 2241b may respectively extend from front and rear sides of one side surface of the body 221, extend at least outward from one side surface of the head portion R3, and then extend at least immediately downward from one side lower surface of the head portion R3.

The pair of first fixing frames 2241a and 2241b may be respectively provided at the front and rear sides of one side surface of the body 221 and integrated with the body 221.

The first grip frame 2242 may be connected to lower ends of the pair of first fixing frames 2241a and 2241b and have a shape capable of holding one side lower surface of the head portion R3.

The first grip frame 2242 may be mounted or replaced in accordance with a shape (type) of the rail R.

The variable clamp 225 may be provided at the other side of the body 221. When the rail management device 20 is installed on the rail R, the variable clamp 225 may serve to fix the other side of the body 221 by pressure applied by elasticity of the elastic clamp 223 in the state in which the elastic clamp 223 and the invariable clamp 224 are fixed to the rail R and are in close contact with the other side lower surface of the head portion R3.

In addition, the variable clamp 225 may be configured as an openable type so that the rail management device 20 may be easily fitted with or removed from the head portion R3 during the process of installing the rail management device 20 on the rail R or removing the rail management device 20 from the rail R after the installation.

In addition, the variable clamp 225 may be configured as a rotary type so that in a state in which the variable clamp 225 is fitted with the head portion R3, the variable clamp 225 is pressed inward to fix the other side lower surface while being in close contact with the other side lower surface.

The variable clamp 225 may include a pair of second fixing frames 2251a and 2251b, a pair of rotary shafts 2252a and 2252b, a pair of rotary frames 2253a and 2253b, an adjustment frame 2254, a second grip frame 2255, and a lever 2256.

The pair of second fixing frames 2251a and 2251b may respectively extend from front and rear sides of the other side surface of the body 221, extend at least outward from the other side surface of the head portion R3, and then extend immediately downward by a predetermined length.

The pair of second fixing frames 2251a and 2251b may be respectively provided at the front and rear sides of the other side surface of the body 221 and integrated with the body 221. The pair of second fixing frames 2251a and 2251b may be provided at positions facing the pair of first fixing frames 2241a and 2241b of the invariable clamp 224.

The pair of rotary shafts 2252a and 2252b may be respectively installed on inner surfaces of the pair of second fixing frames 2251a and 2251b.

The pair of rotary frames 2253a and 2253b may be respectively and rotatably connected to the pair of rotary shafts 2252a and 2252b and extend at least immediately downward from the other side lower surface of the head portion R3.

The adjustment frame 2254 may be connected to upper ends of the pair of rotary frames 2253a and 2253b.

The second grip frame 2255 may be connected to lower ends of the pair of rotary frames 2253a and 2253b and have a shape capable of holding the other side lower surface of the head portion R3.

The second grip frame 2255 may be provided at a position facing the first grip frame 2242 of the invariable clamp 224.

Like the first grip frame 2242, the second grip frame 2255 may be mounted or replaced in accordance with a shape (type) of the rail R.

The lever 2256 may penetrate the adjustment frame 2254 and be installed to be connected to the other side surface of the body 221.

The lever 2256 may rotate the pair of rotary frames 2253a and 2253b so that the second grip frame 2255 is brought into close contact with the other side lower surface of the head portion R3 or spaced apart from the other side lower surface of the head portion R3. A maximum fastening force may be 185 to 195 kN.

The rail management device 20 of the present embodiment configured as described above may accurately set a reference with respect to the rail R by means of the structure including the elastic clamp 223, the invariable clamp 224, and the variable clamp 225 seated on the head portion R3.

In addition, the rail management device 20 of the present embodiment may be equipped with the single driving belt 217 provided to connect the pair of displacement sensors 218a and 218b to the single motor 213, and the rail management device 20 may measure the shape of the surface of the rail R and the abrasion amount of the rail while simultaneously moving the pair of displacement sensors 218a and 218b, which is connected to the inner and outer belts of the driving belt 217, at the same height and the same movement distance.

In addition, in the rail management device 20 of the present embodiment, the at least two push-type elastic clamps 223, which are configured as the springs 2232, may be provided on the upper surface of the head portion R3, and the invariable clamp 224 and the variable clamp 225 may be provided on the lower surface of the head portion R3 in order to compensate for a part where heights of the pair of displacement sensors 218a and 218b are not always constant. Therefore, the rail management device 20 may be safely fixed to the head portion R3, and the pair of displacement sensors 218a and 218b may be positioned at the constant height, such that it is possible to configure the rail profile having a final reliable shape by collecting data measured by the pair of displacement sensors 218a and 218b.

In addition, in the rail management device 20 of the present embodiment, the clamp part for fixing the rail management device 20 to the rail may include the elastic clamp 223, the invariable clamp 224, and the variable clamp 225, and the variable clamp 225 is configured as an openable or rotary type, such that the rail management device 20 may be installed on or removed from the head portion R3.

In addition, in the rail management device 20 of the present embodiment, the pair of driven pulleys 215a and 215b, which is configured to support two opposite ends of the driving belt 217 and rotate, may be configured as tension pulleys, thereby maintaining tension of the driving belt 217.

In addition, the rail management device 20 of the present embodiment is configured to constantly maintain the criteria or fixing points for determining the accurate positions and heights of the pair of displacement sensors 218a and 218b configured to measure the transverse section profile of the rail R, thereby obtaining the accurate and precise measurement value of the transverse section profile of the rail R.

In addition, the rail management device 20 of the present embodiment may constantly maintain or synchronize the heights and movement amounts of the two displacement sensors 218a and 218b, which are positioned at the two opposite sides of the transverse section profile of the rail R, by using the single belt structure and using the single motor 213. Further, the rail management device 20 may be configured to perform the measurement based on the lower surface of the head portion R3 that is hardly deformed even though the rail R is used over a long period of time on site. Therefore, it is possible to accurately and precisely measure the absolute abrasion amount and the change amount on the upper and lateral surfaces of the head portion R3.

Figure 11:
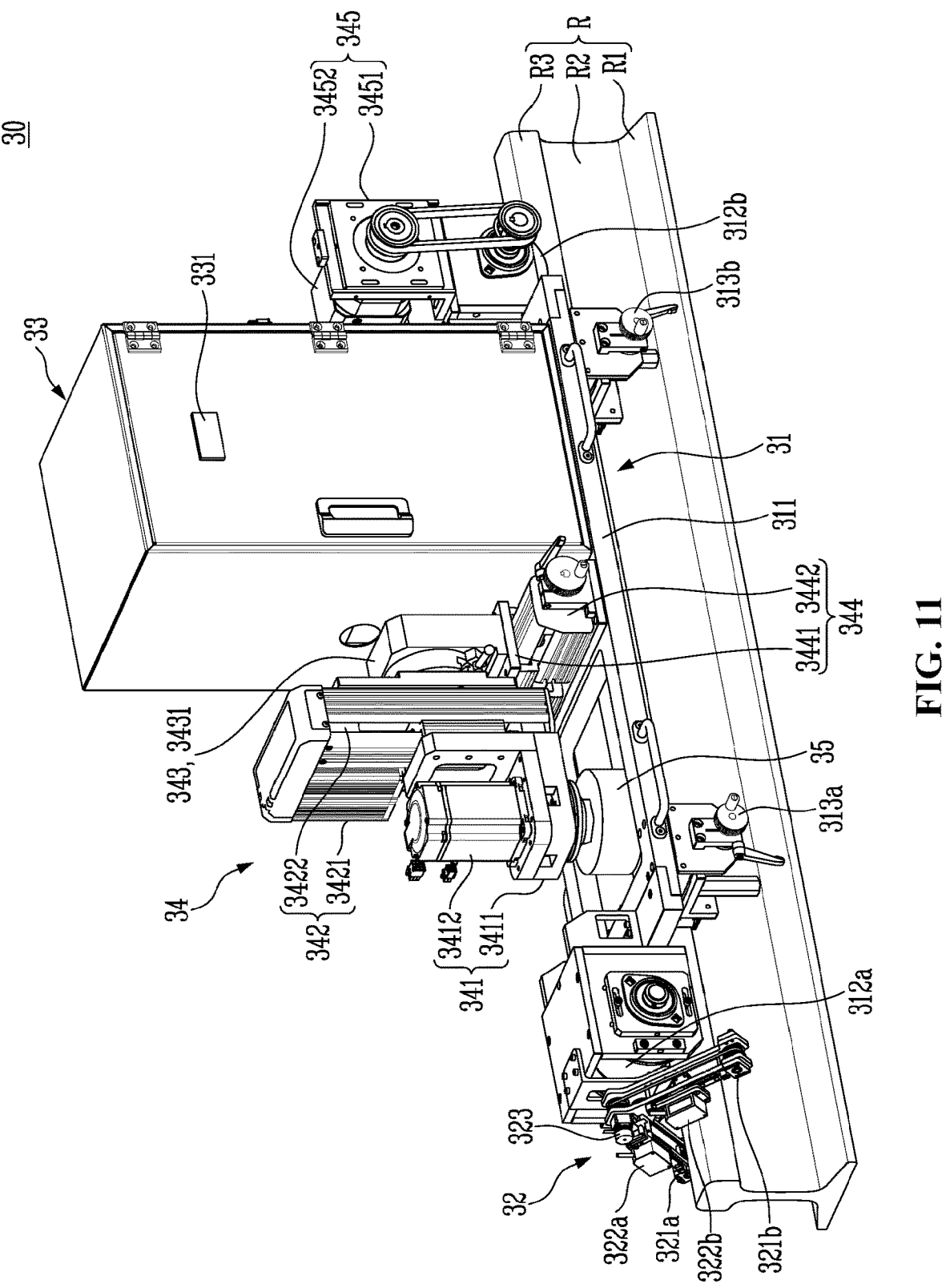
FIG. 11 is a front perspective view of a rail management device according to a third embodiment of the present invention.
Figure 12:
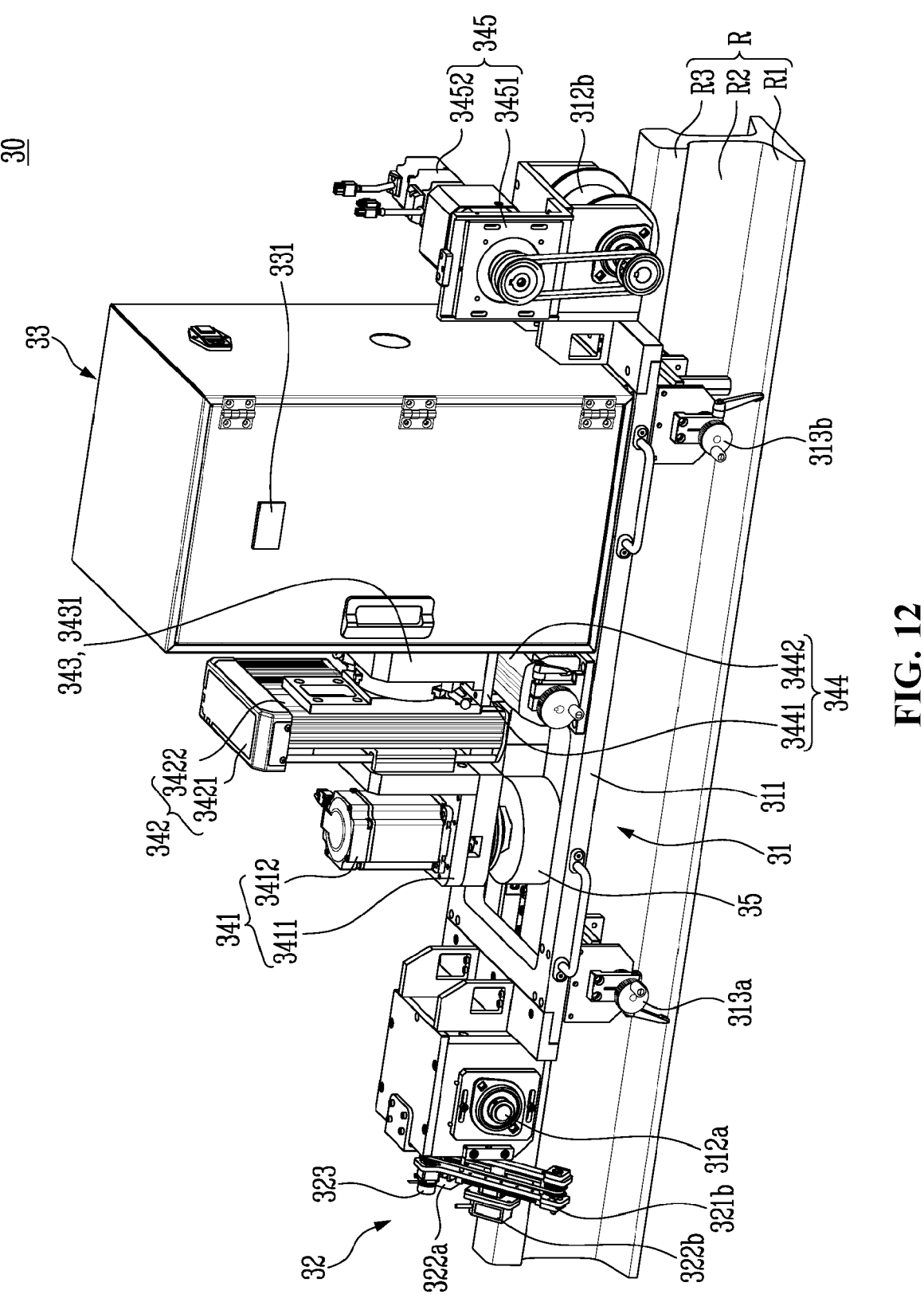
FIG. 12 is a rear perspective view of the rail management device according to the third embodiment of the present invention.
Figure 13:
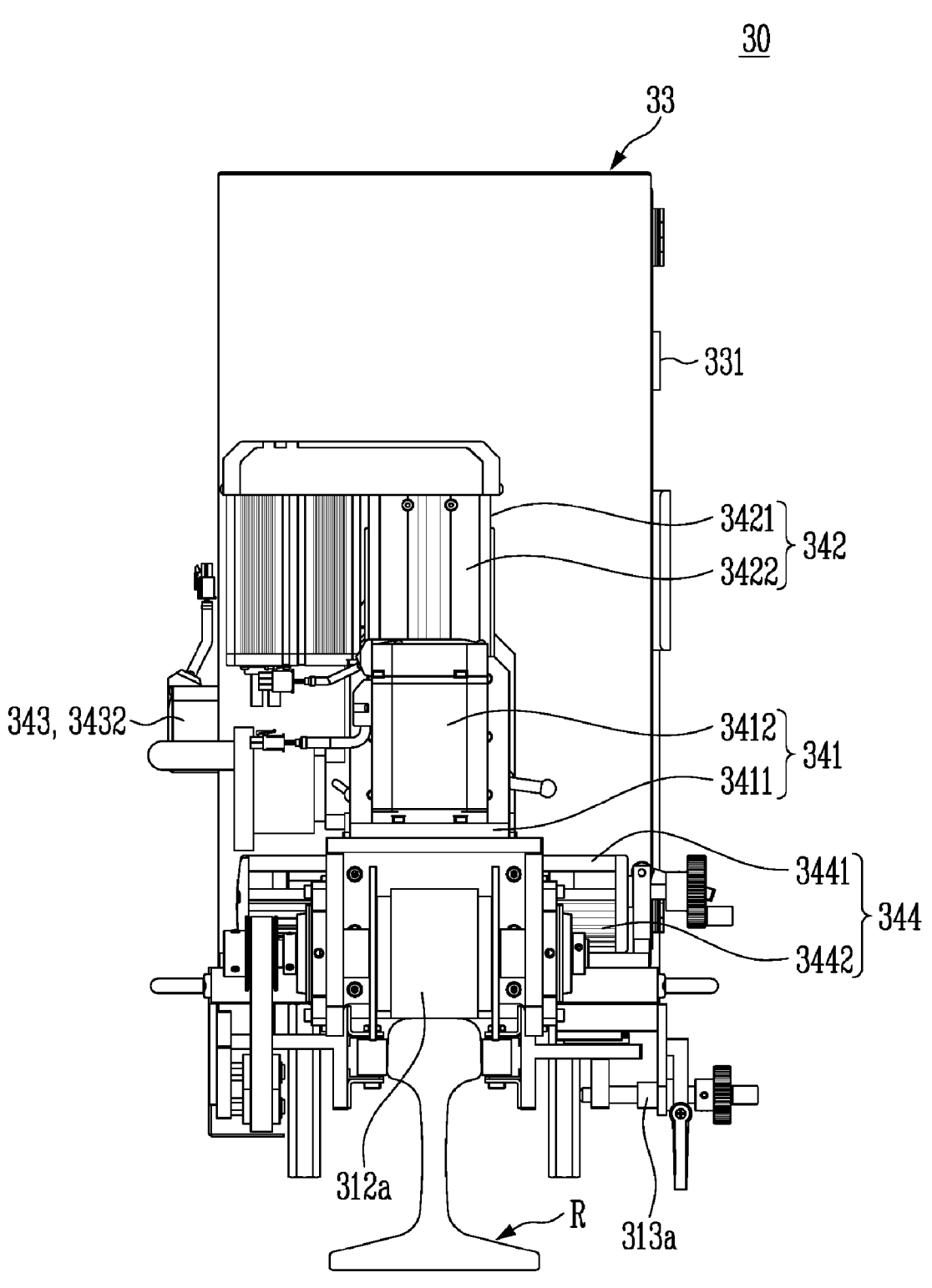
FIG. 13 is a front view illustrating a state in which a measurement means is excluded from the rail management device according to the third embodiment of the present invention.
Figure 14:
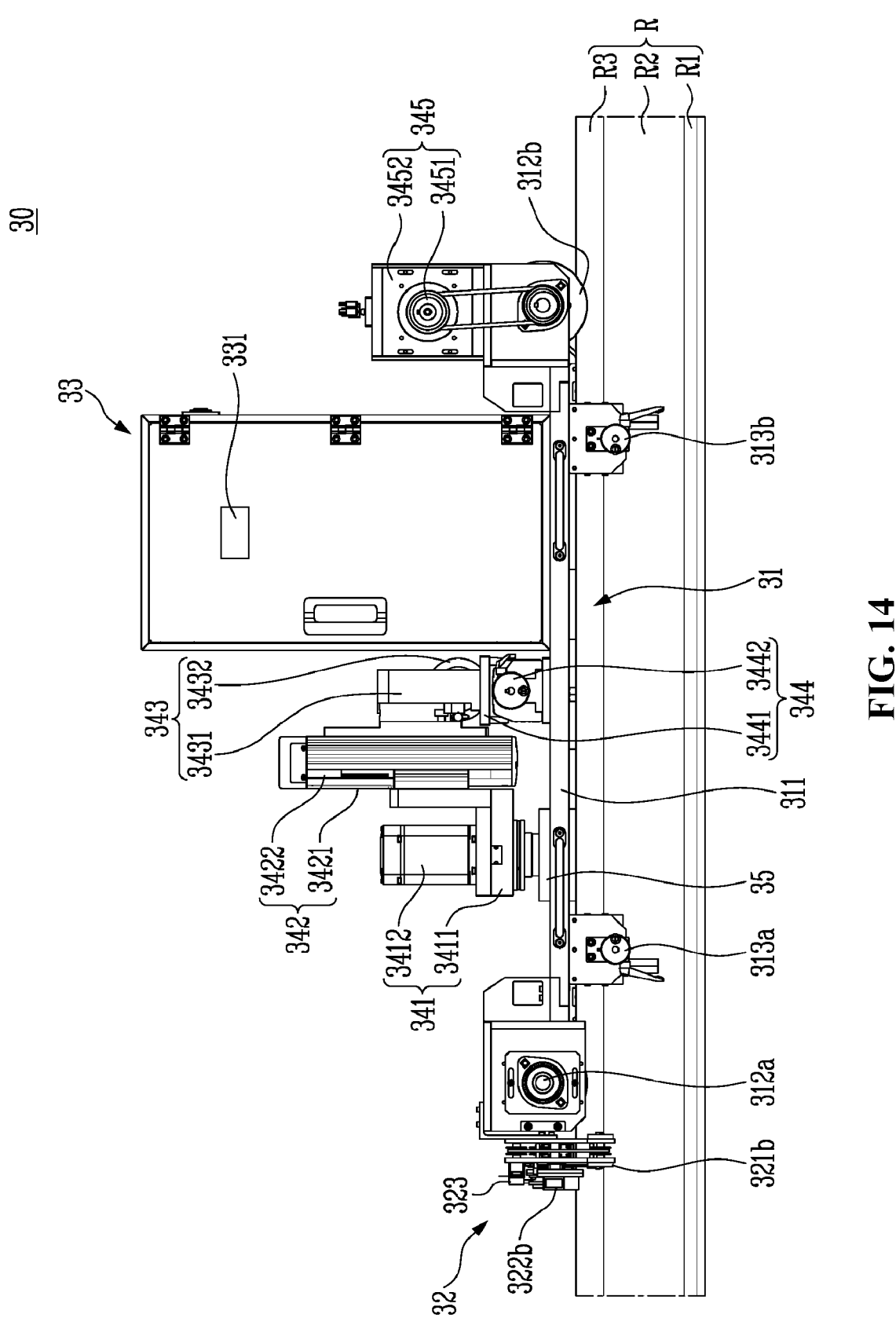
FIG. 14 is a side view of the rail management device according to the third embodiment of the present invention.
Figure 15:
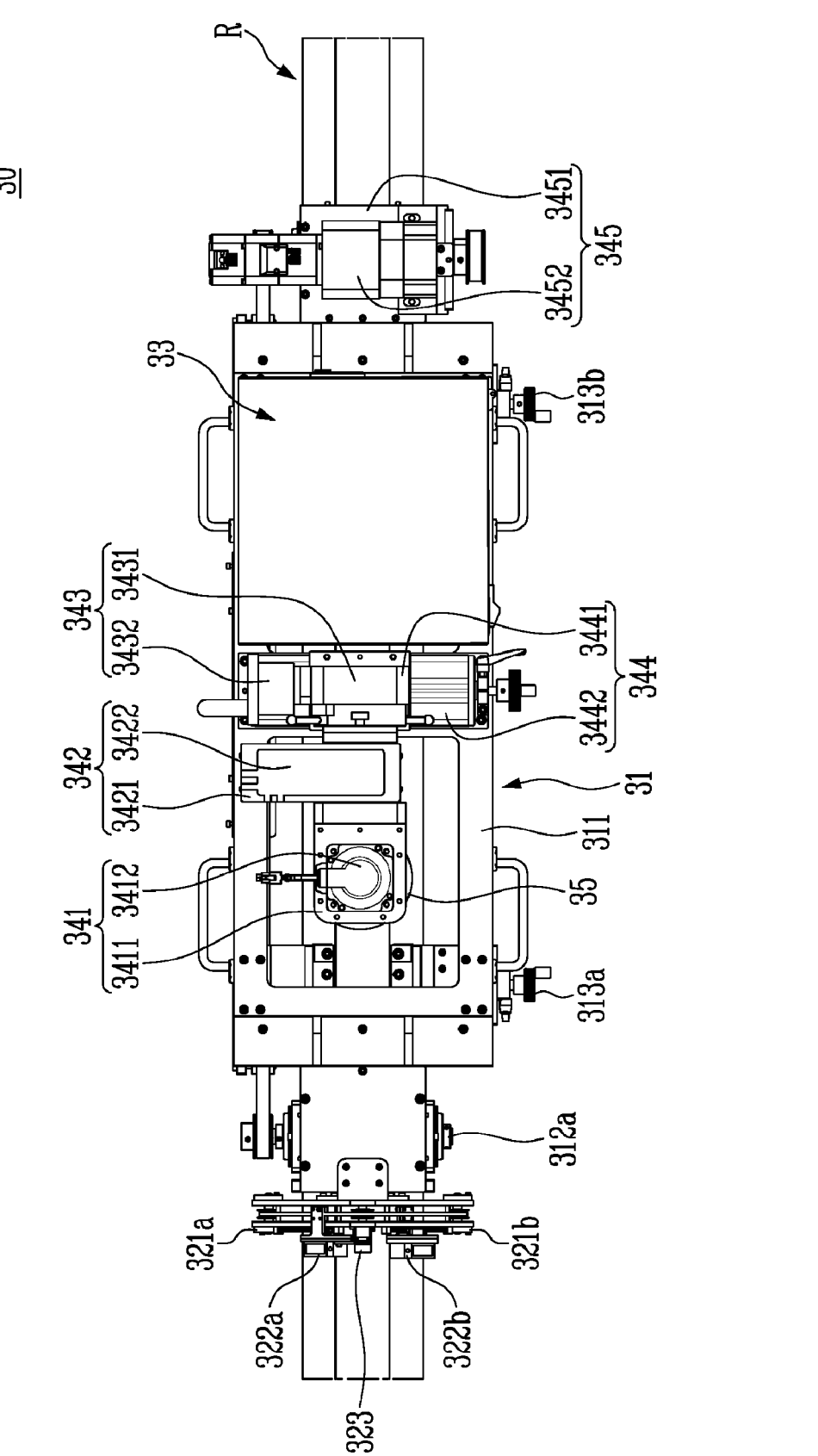
FIG. 15 is a top plan view of the rail management device according to the third embodiment of the present invention.

FIG. 11 is a front perspective view of a rail management device according to a third embodiment of the present invention, FIG. 12 is a rear perspective view of the rail management device according to the third embodiment of the present invention, FIG. 13 is a front view illustrating a state in which a measurement means is excluded from the rail management device according to the third embodiment of the present invention, FIG. 14 is a side view of the rail management device according to the third embodiment of the present invention, and FIG. 15 is a top plan view of the rail management device according to the third embodiment of the present invention.

As illustrated in FIGS. 11 to 15, a rail management device 30 according to a third embodiment of the present invention may serve as a rail grinding device for grinding the surface of the rail R including the base portion R1, the web portion R2, and the head portion R3 and include a movement means 31 movably installed on the rail R, a measurement means 32 mounted on the movement means 31 and configured to measure the upper and lateral profiles of the head portion R3, a controller 33 mounted on the movement means 31 and configured to calculate an abrasion value by comparing a measurement value transmitted from the measurement means 32 with a preset reference value, and a grinding means 34 mounted on the movement means 31 and configured to grind the upper and lateral surfaces of the head portion R3 by using a grinding stone 35, the grinding means 34 being configured to implement a rotational force of the grinding stone 35, upward and downward movements of the grinding stone 35, leftward and rightward movements of the grinding stone 35, a grinding angle of the grinding stone 35, and forward and rearward movements of the grinding stone 35 on the basis of the abrasion value.

The movement means 31 may be movably installed on the rail R and include a main frame 311, wheels 312a and 312b, and rail guides 313a and 313b.

The main frame 311 may be configured such that the measurement means 32, the controller 33, and the grinding means 34 are mounted on the main frame 311.

The wheels 312a and 312b may be installed at front and rear sides of the main frame 311 and seated on the head portion R3 to allow the main frame 311 to be movable.

As described below, the wheels 312a and 312b may be operated by a fifth motor 3452 of a fifth grinding adjusting part 345 mounted on the main frame 311.

The rail guides 313a and 313b may be installed as a plurality of rail guides 313a and 313b installed on two opposite surfaces of the main frame 311, and one pair of rail guides is provided for each of the two opposite surfaces of the main frame 311. The rail guides 313a and 313b may maintain a horizontal state of the main frame 311 and prevent the main frame 311 from separating from the rail R.

In the present embodiment, the configuration has been described in which the movement means 31 includes the main frame 311, the wheels 312a and 312b, and the rail guides 313a and 313b. However, various movement means, such as a carriage in the related art, which are installed on the rail R and moved, may, of course, be included.

The measurement means 32 may be mounted on the movement means 31 and measure the upper and lateral profiles of the head portion R3.

The measurement means 32 may transmit the measured profile measurement value to the controller 33 in a wired or wireless manner and include a pair of guide frames 321a and 321b and a pair of displacement sensors 322a and 322b.

The pair of guide frames 321a and 321b may be mounted at the front side of the movement means 31. The pair of guide frames 321a and 321b may extend downward at predetermined gradients based on the centerline of the head portion R3 and extend at least to the position of the lower surface of the head portion R3.

The pair of displacement sensors 322a and 322b may be respectively mounted on the pair of guide frames 321a and 321b. The pair of displacement sensors 322a and 322b may be mounted on the pair of guide frames 321a and 321b so as to be movable by a motor 323.

The pair of displacement sensors 322a and 322b may independently perform the measurement operations. The pair of displacement sensors 322a and 322b may be synchronized with the grinding means 34 to be described below and inspect, in real time, a state of the grinding operation. For example, when a third grinding adjusting part 343 and/or a fourth grinding adjusting part 344 operates, the pair of displacement sensors 322a and 322b may be synchronized with the grinding angle and/or the grinding position of the grinding stone 35 and inspect, in real time, the state of grinding operation.

The pair of displacement sensors 322a and 322b may each be a laser displacement sensor identical or similar to the above-mentioned displacement sensors 119a, 119b, 218a, and 218b of the first and second embodiments. However, the present invention is not limited thereto, and other sensors capable of measuring displacements may, of course, be included.

In the present embodiment, the configuration has been described in which the measurement means 32 includes the pair of guide frames 321a and 321b and the pair of displacement sensors 322a and 322b. However, the measurement means, which constitutes the rail profile measurement device in the related art capable of measuring the upper and lateral profiles of the head portion R3, may, of course, be the measurement units 11 and 21 applied to the management devices 10 and 20 of the first and second embodiments.

That is, in case that the measurement means 32 of the present embodiment is the measurement unit 21 of the second embodiment, the measurement means 32 may include the first main frame 211 mounted at the front side of the movement means 31, positioned on the upper portion of the head portion R3, and provided to be consistent with the centerline of the head portion R3, the second main frame 212 provided on the same line as the first main frame 211 and spaced apart from the first main frame 211 at a predetermined distance, the pair of first auxiliary frames 211a and 211b respectively connected to the two opposite sides of the first main frame 211, extending downward at predetermined gradients, and extending at least to the position of the lower surface of the head portion R3, the pair of second auxiliary frames 212a and 212b provided on the same line as the pair of first auxiliary frames 211a and 211b and spaced apart from the pair of first auxiliary frames 211a and 211b at predetermined distances, the pair of displacement sensors 218a and 218b movably and respectively mounted on the pair of second auxiliary frames 212a and 212b, the driving pulley 214 installed between the first main frame 211 and the second main frame 212 and configured to be rotated by the driving power of the motor 213, the pair of driven pulleys 215a and 215b respectively installed between the ends of the pair of first auxiliary frames 211a and 211b and the ends of the pair of second auxiliary frames 212a and 212b, connected to the driving pulley 214 by the driving belt 217, and configured to rotate by receiving the driving power, and the idle pulley 216 installed between the first main frame 211 and the second main frame 212, installed adjacent to the lower side of the driving pulley 214, and configured to guide the inner belt of the driving belt 217.

In addition, in case that the measurement means 32 of the present embodiment is the measurement unit 11 of the first embodiment, the measurement means 32 may include the main frame 111 mounted at the front side of the movement means 31, positioned on the upper portion of the head portion R3, and provided to be consistent with the centerline of the head portion R3, the pair of auxiliary frames 112a and 112b respectively connected to the two opposite sides of the main frame 111, extending downward at predetermined gradients, and extend at least to the position of the lower surface of the head portion R3, the pair of displacement sensors 119a and 119b respectively and movably mounted on the pair of auxiliary frames 112a and 112b, the driving pulley 114 installed on the main frame 111 and configured to be rotated by the driving power of the motor 213, the pair of first driven pulleys 115a and 115b installed on the main frame 111 to define the triangular structure together with the driving pulley 114, connected to the driving pulley 114 by the driving belt 117, and configured to rotate by receiving the driving power, and the pair of second driven pulleys 116a and 116b respectively installed at the ends of the pair of auxiliary frames 112a and 112b, respectively connected to the pair of first driven pulleys 115a and 115b by the pair of timing belts 118a and 118b, and configured to rotate.

In the present embodiment, the measurement means 32 is illustrated as being mounted forward of the structure of the front wheel 312a of the movement means 31. However, the measurement means 32 may, of course, be installed rearward of the structure of the front wheel 312a. Alternatively, the measurement means 32 may be installed on the main frame 311 and provided forward of the grinding stone 35. That is, the measurement means 32 may be installed at any portion provided forward of the grinding stone 35 and measure the profile of the head portion R3 to be ground.

The controller 33 may be mounted on the movement means 31.

The controller 33 may receive, in a wired or wireless manner, the data related to the abrasion amount of the vertical abrasion and the lateral abrasion of the head portion R3 measured, in real time, by the pair of displacement sensors 322*a* and 322*b* of the measurement means 32 and recognize and manage the absolute abrasion amount and the change amount of the final profile of the head portion R3.

In addition, the controller 23 may calculate the abrasion value by comparing the measurement value, which is transmitted from the pair of displacement sensors 322*a* and 322*b* of the measurement means 32, with the preset reference value and control the first to fifth grinding adjusting parts 341, 342, 343, 344, and 345 of the grinding means 34 on the basis of the calculated abrasion value.

In the present embodiment, the preset reference value may be a value set for a peripheral rail profile, i.e., an original transverse section of the rail R when a welded or connected portion, which connects the adjacent rails R to manufacture the rail R, is grounded. The preset reference value may be determined in consideration of the abrasion amount and the like in accordance with the age of the rail R or the frequency of use at the time of grinding a scratched portion, an abraded portion, a damaged portion, or an irregular portion that occurs on the rail R being used for the traveling vehicle.

In addition, the calculated abrasion value may be a difference between the measurement value and the preset reference value and vary depending on the measurement value.

The controller 33 may include a manipulation part.

A manipulation part 331 may implement various grinding operations by selecting any one grinding mode among a first grinding mode for grinding all the upper surface, the left surface, and the right surface of the head portion R3, a second grinding mode for grinding only the upper surface of the head portion R3, a third grinding mode for grinding only the left surface of the head portion R3, and a fourth grinding mode for grinding only the right surface of the head portion R3. In this case, the second grinding mode may be applied to a straight section in which a large amount of friction occurs on the upper surface of the head portion R3. The third and fourth grinding modes may be applied to a left or right curved section in which a large amount of friction occurs on the left or right surface of the head portion R3.

In addition, the manipulation part 331 may perform any one grinding mode among the first to fourth grinding modes and then inspect a ground state of the head portion R3. When the ground state is less than the abrasion value, a fifth grinding mode may be selected to move the movement means 31 rearward so that the head portion R3 is grounded again.

The grinding means 34 may be mounted on the movement means 31 and grind the upper and lateral surfaces of the head portion R3 by using the grinding stone 35. The grinding means 34 may implement the rotational force of the grinding stone 35, the upward and downward movements of the grinding stone 35, the leftward and rightward movements of the grinding stone 35, the grinding angle of the grinding stone 35, and the forward and rearward movements of the grinding stone 35 on the basis of the abrasion value.

The grinding means 34 may include a first grinding adjusting part 341, a second grinding adjusting part 342, the third grinding adjusting part 343, the fourth grinding adjusting part 344, and the fifth grinding adjusting part 345.

The first grinding adjusting part 341 may be mounted on a first frame 3411 and includes a first motor 3412 configured to rotate the grinding stone 35.

The second grinding adjusting part 342 may be mounted on a second frame 3421 fixedly connected to the first frame 3411 and include a second motor 3422 configured to adjust a grinding depth of the grinding stone 35 by moving the second frame 3421 upward or downward.

The third grinding adjusting part 343 may be mounted on a third frame 3431 connected to the second frame 3421 and configured to be slidable upward and downward. The third grinding adjusting part 343 may include a third motor 3432 configured to adjust a grinding angle of the grinding stone 35 by rotating the third frame 3431 leftward and rightward.

The fourth grinding adjusting part 344 may be mounted on a fourth frame 3441 fixedly connected to the third frame 3431 and include a fourth motor 3442 configured to adjust a grinding position of the grinding stone 35 by moving the fourth frame 3441 leftward and rightward.

The fifth grinding adjusting part 345 may be mounted on a fifth frame 3451 fixedly connected to the main frame 311 and include the fifth motor 3452 configured to adjust a grinding position of the grinding stone 35 by operating the wheels 312*a* and 312*b*.

In the above-mentioned configuration, the grinding means 34 may be fixed to the main frame 311 by the fourth motor 3442 of the fourth grinding adjusting part 344 and the fifth grinding adjusting part 345, and the remaining components may not be connected directly to the main frame 311.

The controller 33 of the rail management device 30 of the present embodiment configured as described above may perform various grinding operations by controlling the grinding means 34 on the basis of the measurement value transmitted from the measurement means 32. This will be described below specifically.

First, when the first grinding mode for grinding all the upper surface, the left surface, and the right surface of the head portion R3 is selected by the manipulation part 331, the controller 33 may perform the following grinding operation.

The controller 33 may receive, from the measurement means 32, the measurement value related to the profiles of the upper surface, the left surface, and the right surface of the head portion R3, compare the measurement value with the preset reference value, and calculate a grinding value related to a portion of the head portion R3 that needs to be ground.

In the state in which the grinding stone is positioned on the upper surface of the head portion R3, the controller 33 may rotate the grinding stone 35 by operating the first grinding adjusting part 341.

The controller 33 may bring the rotating grinding stone 35 into close contact with the upper surface of the head portion R3 by operating the second grinding adjusting part 342 in order to grind the head portion R3 to the grinding depth corresponding to the grinding value.

In case that there is no load of the first motor 3412 during the process of grinding the upper surface of the head portion R3, the controller 33 may determine that the grinding is completed. The controller 33 may move the grinding stone 35 leftward (or rightward) by operating the fourth grinding adjusting part 344 and simultaneously adjust the grinding angle of the grinding stone 35 by also operating the third grinding adjusting part 343 in consideration of the curved profile of the left surface (or the right surface) of the head portion R3.

In case that there is no load of the first motor 3412 during the process of grinding the left surface (or the right surface)

of the head portion R3, the controller 33 may determine that the grinding is completed. The controller 33 may operate the fifth grinding adjusting part 345 and move forward the grinding stone 35, which is positioned on the left surface (or the right surface) of the head portion R3, to a grinding position on the head portion R3 at which the head portion R3 is newly ground.

In case that there is no load of the first motor 3412 during the process of grinding the front left surface (or the front right surface) of the head portion R3 newly moved, the controller 33 may determine that the grinding is completed. The controller 33 may repeatedly operate the third to fifth grinding adjusting parts 343, 344, and 345 so that the head portion R3 is grounded in the longitudinal direction of the rail R while the grinding stone 35 sequentially moves along the upper surface→the left surface→the front left surface→the front upper surface→the front right surface of the head portion R3.

The controller 33 may consistently control the upward and downward movements of the second grinding adjusting part 342 so that the load of the first motor 3412 does not exceed a preset load value while the grinding stone 35 performs the grinding operation.

In addition, when the second grinding mode for grinding only the upper surface of the head portion R3 is selected by the manipulation part 331, the controller 33 may perform the following grinding operation.

The controller 33 may receive, from the measurement means 32, the measurement value related to the profile of the upper surface of the head portion R3, compare the measurement value with the preset reference value, and calculate a grinding value related to a portion of the head portion R3 that needs to be ground.

In the state in which the grinding stone 35 is positioned on the upper surface of the head portion R3, the controller 33 may rotate the grinding stone 35 by operating the first grinding adjusting part 341.

The controller 33 may bring the rotating grinding stone 35 into close contact with the upper surface of the head portion R3 by operating the second grinding adjusting part 342 in order to grind the head portion R3 to the grinding depth corresponding to the grinding value.

In case that there is no load of the first motor 3412 during the process of grinding the upper surface of the head portion R3, the controller 33 may determine that the grinding is completed. The controller 33 may operate the fifth grinding adjusting part 345 and move forward the grinding stone 35, which is positioned on the upper surface of the head portion R3, to a grinding position on the head portion R3 at which the head portion R3 is newly ground.

In case that the there is no load of the first motor 3412 during the process of grinding the front upper surface of the head portion R3 newly moved, the controller 33 may determine that the grinding is completed. The controller 33 may repeatedly operate the fifth grinding adjusting part 345 so that the head portion R3 is grounded in the longitudinal direction of the rail R while the grinding stone 35 moves along the upper surface of the head portion R3.

The controller 33 may consistently control the upward and downward movements of the second grinding adjusting part 342 so that the load of the first motor 3412 does not exceed the preset load value while the grinding stone 35 performs the grinding operation.

In addition, when the third grinding mode (or the fourth grinding mode) for grinding only the left surface (or the right surface) of the head portion R3 is selected by the manipulation part 331, the controller 33 may perform the following grinding operation.

The controller 33 may receive from the measurement means 32, the measurement value related to the profiles of the left surface (or the right surface) of the head portion R3, compare the measurement value with the preset reference value, and calculate a grinding value related to a portion of the head portion that needs to be ground.

The controller 33 may simultaneously move the grinding stone 35 leftward (or rightward) by operating the fourth grinding adjusting part 344, adjust the grinding angle of the grinding stone by also operating the third grinding adjusting part 343 in consideration of the curved profile of the left surface (or the right surface) of the head portion R3, and rotate the grinding stone 35 by operating the first grinding adjusting part 341 in the state in which the grinding stone 35 is positioned on the left surface (or the right surface) of the head portion R3.

The controller 33 may bring the rotating grinding stone 35 into close contact with the left surface (or the right surface) of the head portion R3 by operating the second grinding adjusting part 342 in order to grind the head portion R3 to the grinding depth corresponding to the grinding value.

In case that there is no load of the first motor 3412 during the process of grinding the left surface (or the right surface) of the head portion R3, the controller 33 may determine that the grinding is completed. The controller 33 may operate the fifth grinding adjusting part 345 and move forward the grinding stone 35, which is positioned on the left surface (or the right surface) of the head portion R3, to a grinding position on the head portion R3 at which the head portion R3 is newly ground.

In case that there is no load of the first motor 3412 during the process of grinding the front left surface (or the front right surface) of the head portion R3 newly moved, the controller 33 may determine that the grinding is completed. The controller 33 may repeatedly operate the fifth grinding adjusting part 345 so that the head portion R3 is grounded in the longitudinal direction of the rail R while the grinding stone 35 moves along the left surface (or the right surface) of the head portion R3.

The controller 33 may consistently control the upward and downward movements of the second grinding adjusting part 342 so that the load of the first motor 3412 does not exceed the preset load value while the grinding stone 35 performs the grinding operation.

In addition, when the fifth grinding mode for inspecting the ground state of the head portion R3 and grinding the head portion R3 again is selected by the manipulation part 331 after the grinding operation is completed in any one grinding mode among the first to fourth grinding modes, the controller 33 may perform the following inspection and re-grinding operations.

The controller 33 may move the movement means 31 rearward along the rail R, which is completely ground, by operating the fifth grinding adjusting part 345, receive, in real time, the measurement value related to the profile of the ground head portion R3 through the measurement means 32, calculate a new grinding value, and compare the new grinding value with the calculated grinding value.

The controller 33 may determine the re-grinding operation in case that the new grinding value and the calculated grinding value deviate from an error range.

The controller 33 may stop the movement means 31 and then perform the re-grinding operation by using grinding adjusting part suitable for the corresponding grinding mode among the first to fifth grinding adjusting parts 341, 342, 343, 344, and 345.

When the re-grinding operation is completed, the controller 33 may repeatedly perform the process while moving the movement means 31 rearward by means of the fifth grinding adjusting part 345.

The rail management device 30 of the present embodiment configured as described above includes the first to fifth grinding adjusting parts 341, 342, 343, 344, and 345 so as to have a five-axis degree of freedom, thereby effectively grinding the head portion R3.

In addition, the rail management device 30 of the present embodiment may move along the rail R and be configured to compare the measurement value, which is obtained by measuring the transverse section profile of the rail R by using the displacement sensors 322*a* and 322*b*, with the reference value preset to the controller 33 and automatically adjust the grinding position and the grinding intensity of the grinding stone 35, thereby accurately and precisely grinding the welded portion, the connected portion, the scratched portion, the abraded portion, the damaged portion, or other irregular portions of the rail R.

In addition, the rail management device 30 of the present embodiment may be configured to compare the measurement value, which is obtained by measuring the transverse section profile of the rail R by using the displacement sensors 322*a* and 322*b*, with the reference value preset to the controller 33 and automatically control the rotational force of the grinding stone, the upward and downward movements of the grinding stone, the leftward and rightward movements of the grinding stone, the grinding angle of the grinding stone, and the forward and rearward movements of the grinding stone. Therefore, it is possible to significantly improve the grinding quality of the rail R, continuously perform the grinding operation in the longitudinal direction of the rail, and identify the ground state and the profile shape in real time.

While the present invention has been described above with reference to the embodiments, the embodiments are just illustrative and not intended to limit the present invention. It can be appreciated by those skilled in the art that various combinations or modifications and applications, which are not described in the embodiments, may be made to the present embodiment without departing from the intrinsic technical features of the present embodiment. Accordingly, the technical content relating to modifications and applications that can be readily derived from the embodiments of the present invention should be construed to be included in the present invention.

DESCRIPTION OF REFERENCE NUMERALS

| | |
|---|---|
| 10: Rail management device | 11: Measurement unit |
| 111: Main frame | 112a, 112b: Auxiliary frame |
| 113: Motor | 114: Driving pulley |
| 115a, 115b: First driven pulley | 116a, 116b: Second driven pulley |
| 117: Driving belt | 118a, 118b: Timing belt |
| 119a, 119b: Displacement sensor | 12: Securing unit |
| 121a, 121b: Lower fixing block | 122a, 122b: Height adjusting part |
| 1221: Support | 1222: First sliding member |
| 1223: Second sliding member | 1224: Adjustment member |
| 1225: Fixing member | 123a, 123b: Upper fixing block |
| 20: Rail management device | 21: Measurement unit |
| 211: First main frame | 211a, 211b: First auxiliary frame |
| 212: Second main frame | 212a, 212b: Second auxiliary frame |

-continued

| | |
|---|---|
| 213: Motor | 214: Driving pulley |
| 215a, 215b: Driven pulley | 216: Idle pulley |
| 217: Driving belt | 218a, 218b: |
| 22: Securing unit | 221: Body |
| 222: Handle | 223: Elastic clamp |
| 2231: Sliding pin | 2232: Spring |
| 224: Invariable clamp | 2241a, 2241b: First fixing frame |
| 2242: First grip frame | 225: Variable clamp |
| 2251a, 2251b: Second fixing frame | 2252a, 2252b: Rotary shaft |
| 2253a, 2253b: Rotary frame | 2254: Adjustment frame |
| 2255: Second grip frame | 2256: Lever |
| 23: Controller | 30: Rail management device |
| 31: Movement means | 311: Main frame |
| 312a, 312b: Wheel | 313a, 313b: Rail guide |
| 32: Measurement means | 321a, 321b: Guide frame |
| 322a, 322b: Displacement sensor | 323: Motor |
| 33: Controller | 331: Manipulation part |
| 34: Grinding means | 341: First grinding adjusting part |
| 3411: First frame | 3412: First motor |
| 342: Second grinding adjusting part | 3421: Second frame |
| 3422: Second motor | 343: Third grinding adjusting part |
| 3431: Third frame | 3432: Third motor |
| 344: Fourth grinding adjusting part | 3441: Fourth frame |
| 3442: Fourth motor | 345: Fifth grinding adjusting part |
| 3451: Fifth frame | 3452: Fifth motor |
| 35: Grinding stone | R: Rail |
| R1: Base portion | R2: Web portion |
| R3: Head portion | |

The invention claimed is:

1. A rail management device configured to measure a transverse section profile of a rail including a base portion, a web portion, and a head portion, the rail management device comprising:

a measurement unit configured to measure upper and lateral profiles of the head portion; and a securing unit fixed to the rail and configured to support and fix the measurement unit, wherein the securing unit comprises:

a body connected to the measurement unit;

an elastic clamp disposed at a lower side of the body to be placed in contact with an upper surface of the head portion;

an invariable clamp disposed at one side of the body to be placed in contact with one side lower surface of the head portion; and a variable clamp disposed at another side of the body to be placed in contact with another side lower surface of the head portion.

2. The rail management device of claim 1, wherein the invariable clamp comprises:

a pair of first fixing frames extending from front and rear sides of one side surface of the body, extending at least outward from one side surface of the head portion, and then extending at least immediately downward from one side lower surface of the head portion; and a first grip frame connected to lower ends of the pair of first fixing frames and having a shape capable of holding one side lower surface of the head portion.

3. The rail management device of claim 1, wherein the variable clamp comprises:

a pair of second fixing frames extending from front and rear sides of another side surface of the body, extending at least outward from another side surface of the head portion, and then extending immediately downward by a predetermined length;

a pair of rotary shafts respectively installed on inner surfaces of the pair of second fixing frames;

a pair of rotary frames respectively and rotatably connected to the pair of rotary shafts and extending at least immediately downward from the another side lower surface of the head portion;

an adjustment frame connected to upper ends of the pair of rotary frames;

a second grip frame connected to lower ends of the pair of rotary frames and having a shape configured to provide holding the another side lower surface of the head portion; and a lever configured to penetrate the adjustment frame and installed to be connected to the another side surface of the body, the lever being configured to rotate the pair of rotary frames so that the second grip frame is brought into close contact with the another side lower surface of the head portion or spaced apart from the another side lower surface of the head portion.

4. The rail management device of claim 1, wherein the elastic clamp is provided as a single elastic clamp provided on a middle portion of the body or provided as at least two elastic clamps provided in a longitudinal direction of the rail, and wherein the elastic clamp comprises:

a sliding pin disposed to penetrate the body; and a spring fastened to the sliding pin.

5. The rail management device of claim 4, wherein the spring has a compressive displacement of 7 to 15 mm and moves the body upward within a pressure range of 193 to 199 N in a state in which the invariable clamp and the variable clamp are in contact with one side and another side of the head portion.

6. The rail management device of claim 1, wherein the measurement unit comprises:

a first main frame positioned on an upper portion of the head portion and provided to be consistent with a centerline of the head portion;

a second main frame provided on a same line as the first main frame and spaced apart from the first main frame at a predetermined distance;

a pair of first auxiliary frames respectively connected to two opposite sides of the first main frame, extending downward at predetermined gradients, extending at least to a position of a lower surface of the head portion, and connected to the body;

a pair of second auxiliary frames provided on a same line as the pair of first auxiliary frames and spaced apart from the pair of first auxiliary frames at predetermined distances; and a pair of displacement sensors respectively and movably mounted on the pair of second auxiliary frames.

7. The rail management device of claim 6, wherein the measurement unit further comprises:

a driving pulley installed between the first main frame and the second main frame and configured to be rotated by driving power of a motor;

a pair of driven pulleys installed between ends of the pair of first auxiliary frames and ends of the pair of second auxiliary frames, connected to the driving pulley by a driving belt, and configured to rotate by receiving the driving power; and an idle pulley installed between the first main frame and the second main frame, installed adjacent to a lower side of the driving pulley, and configured to guide an inner belt of the driving belt.

8. The rail management device of claim 7, wherein the pair of displacement sensors is mounted on the driving belt configured to rotate in a same direction, and the pair of displacement sensors measures, in real time, an abrasion amount of vertical abrasion and lateral abrasion of the head portion and transmits the abrasion amount to a controller in a wired or wireless manner so that an absolute abrasion amount and a change amount related to a final profile of the head portion is recognized, and wherein any one displacement sensor of the pair of displacement sensors is provided between any one driven pulley of the pair of driven pulleys and the driving pulley and mounted on an outer belt of the driving belt, and the other displacement sensor is provided between the other driven pulley and the driving pulley and mounted on the inner belt of the driving belt so that heights and movement amounts are maintained to be equal to one another or synchronized when the upper and lateral profiles of the head portion are measured.

* * * * *